May 23, 1950     W. T. GOLLWITZER     2,508,603
SENSING MECHANISM FOR RECORD CARDS AND THE LIKE
Filed April 19, 1946     11 Sheets-Sheet 1
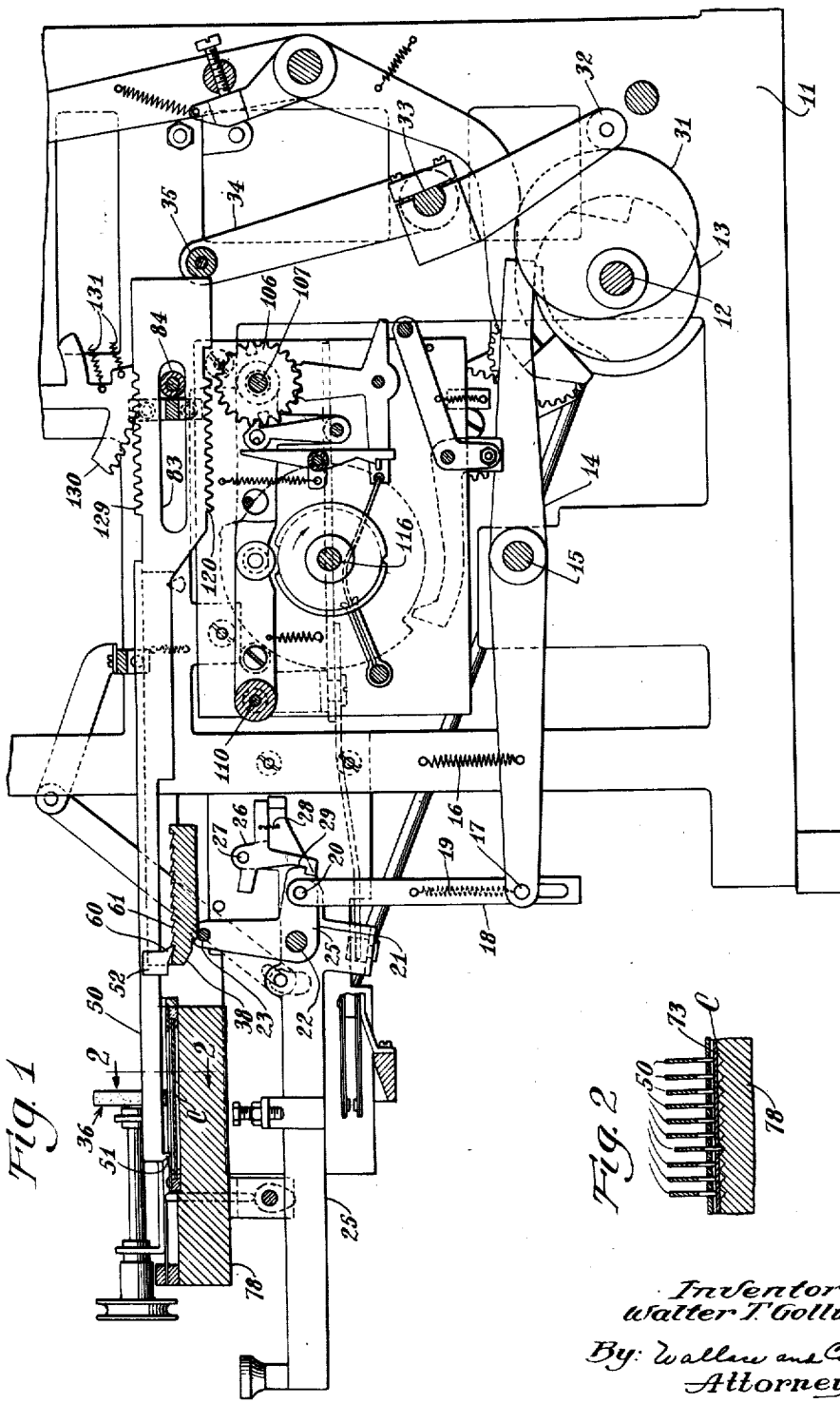
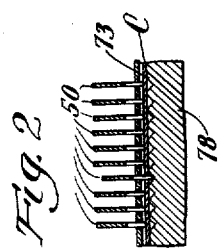
Fig. 1
Fig. 2
Inventor:
Walter T. Gollwitzer,
By Wallace and Cannon
Attorneys May 23, 1950 W. T. GOLLWITZER 2,508,603
SENSING MECHANISM FOR RECORD CARDS AND THE LIKE
Filed April 19, 1946 11 Sheets-Sheet 2
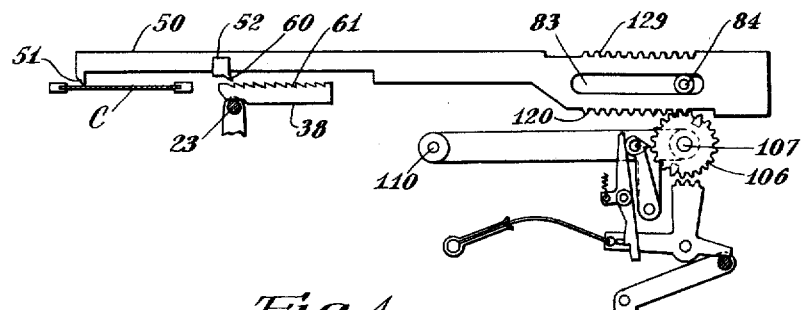
Fig. 3
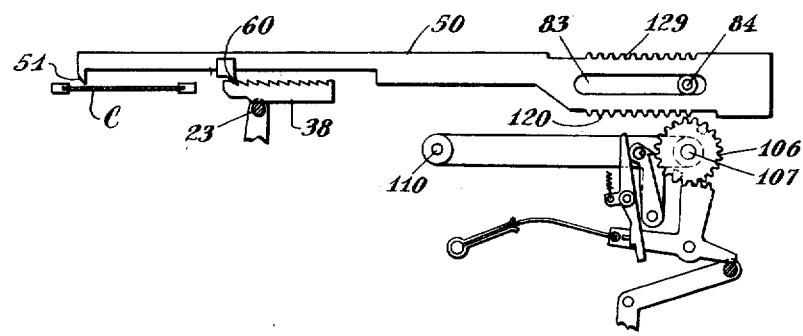
Fig. 4
Fig. 5  Fig. 6  Fig. 7
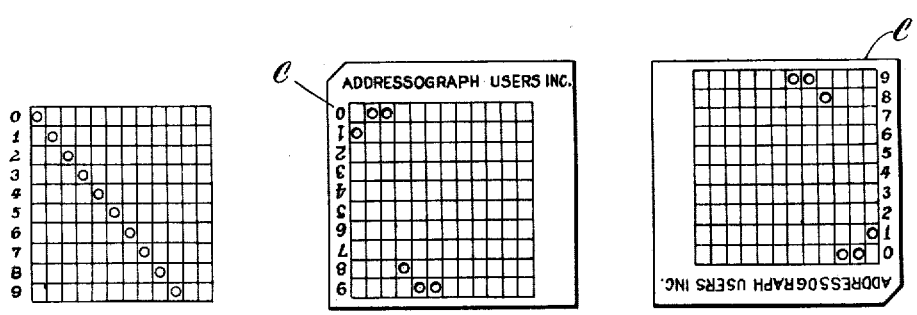
Inventor:
Walter T. Gollwitzer,
By: Wallace and Cannon
Attorneys May 23, 1950     W. T. GOLLWITZER     2,508,603
SENSING MECHANISM FOR RECORD CARDS AND THE LIKE
Filed April 19, 1946     11 Sheets-Sheet 3

INVENTOR.
Walter T. Gollwitzer,
BY
Wallace and Cannon
Attorneys

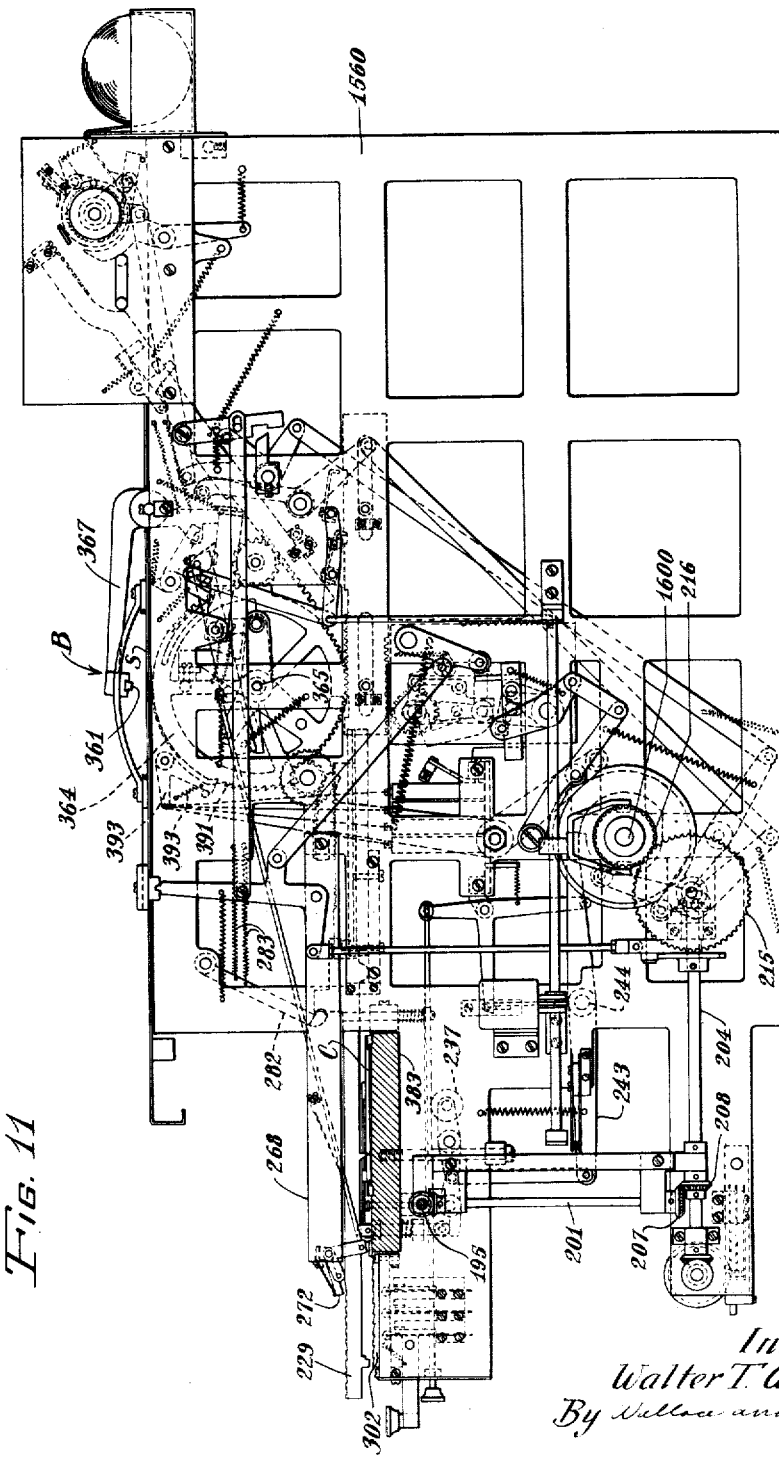

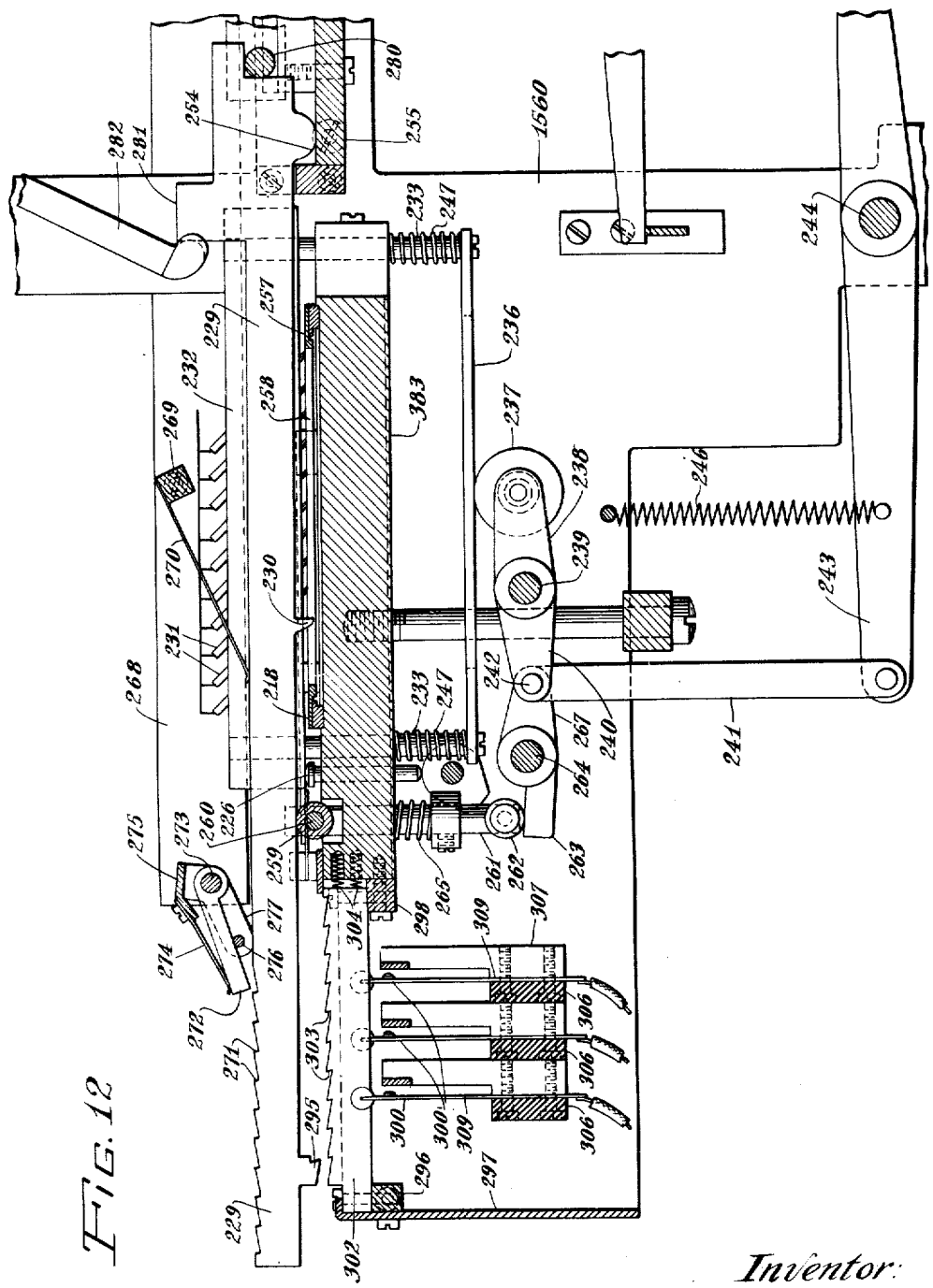

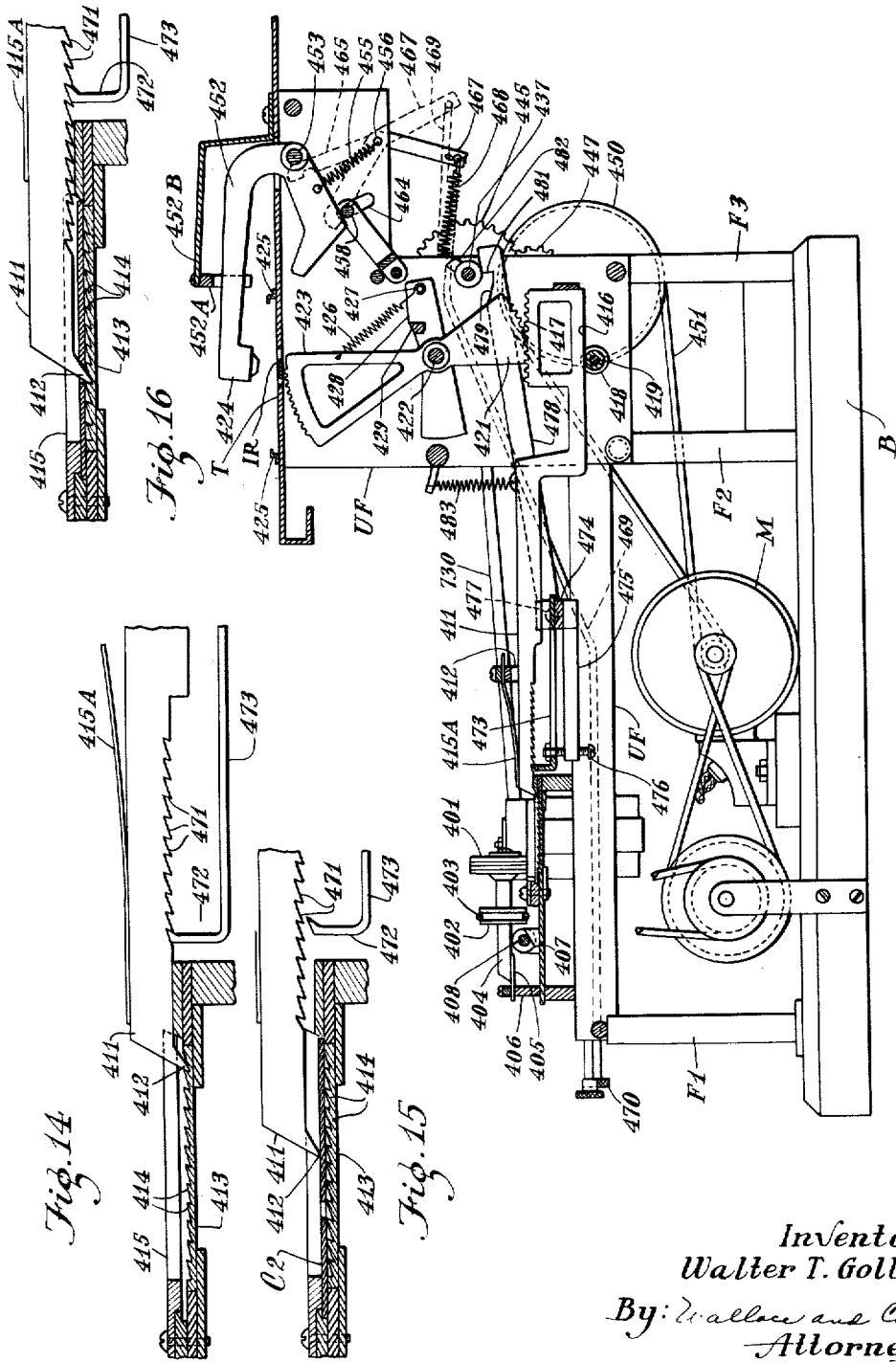

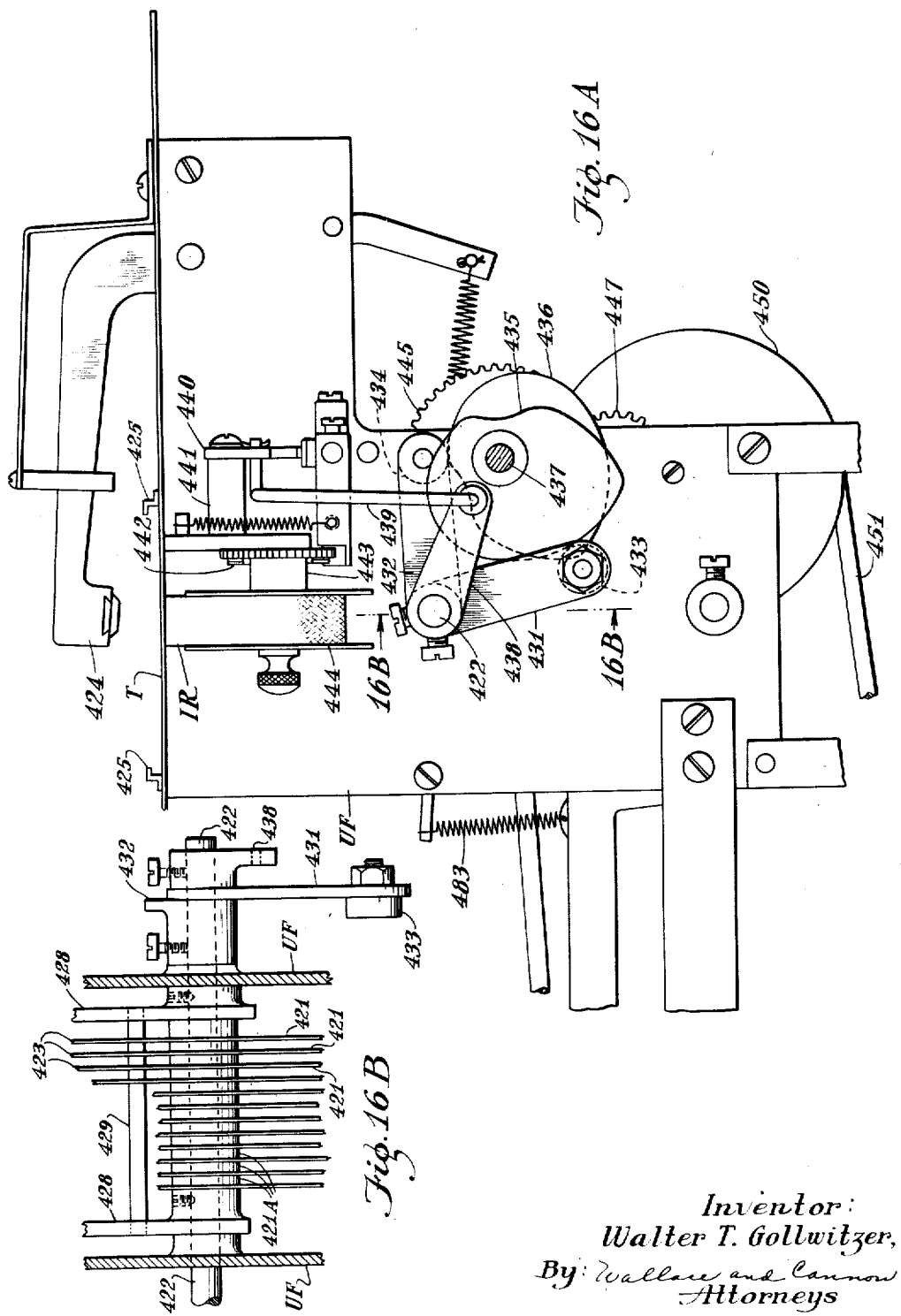

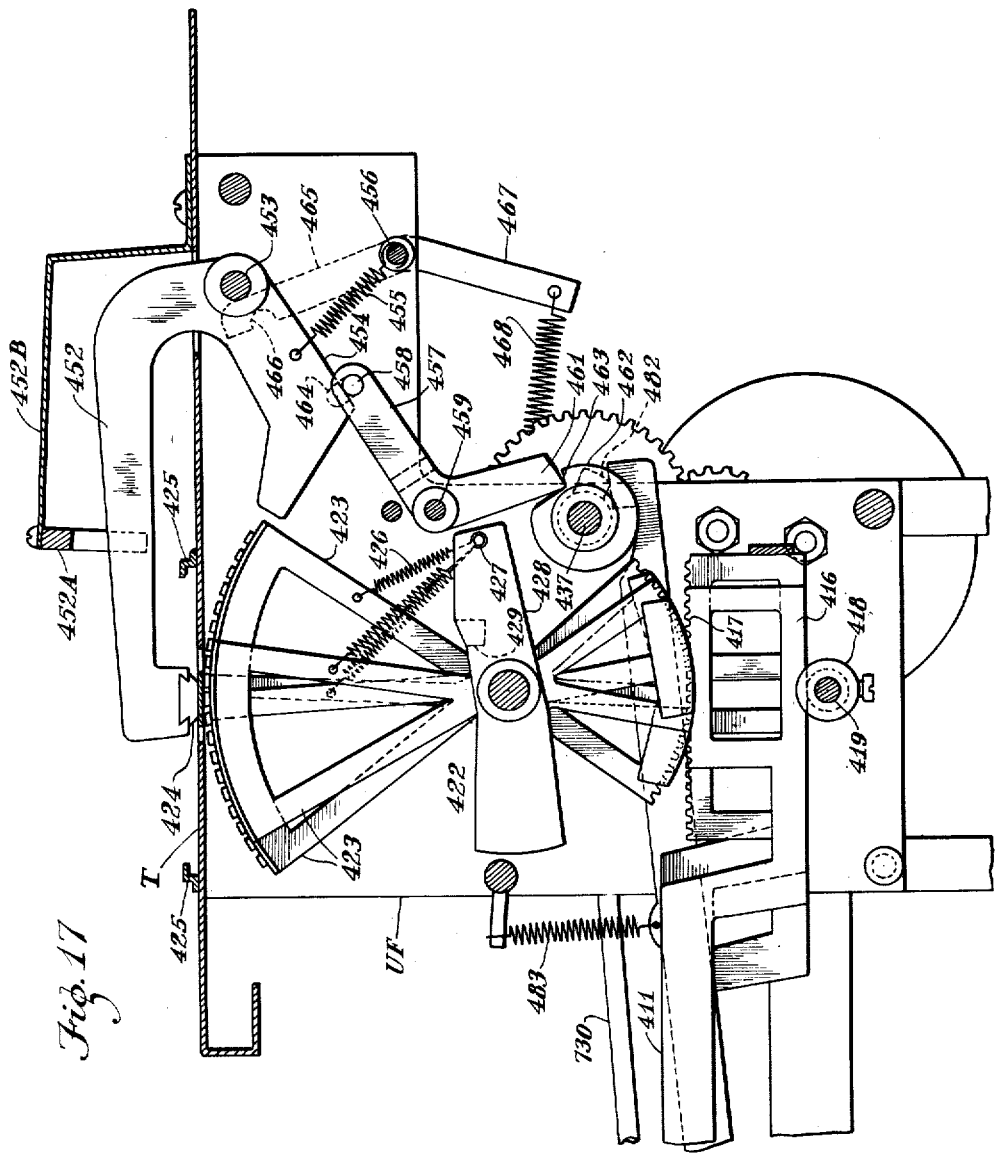

May 23, 1950 W. T. GOLLWITZER 2,508,603
SENSING MECHANISM FOR RECORD CARDS AND THE LIKE
Filed April 19, 1946 11 Sheets-Sheet 9
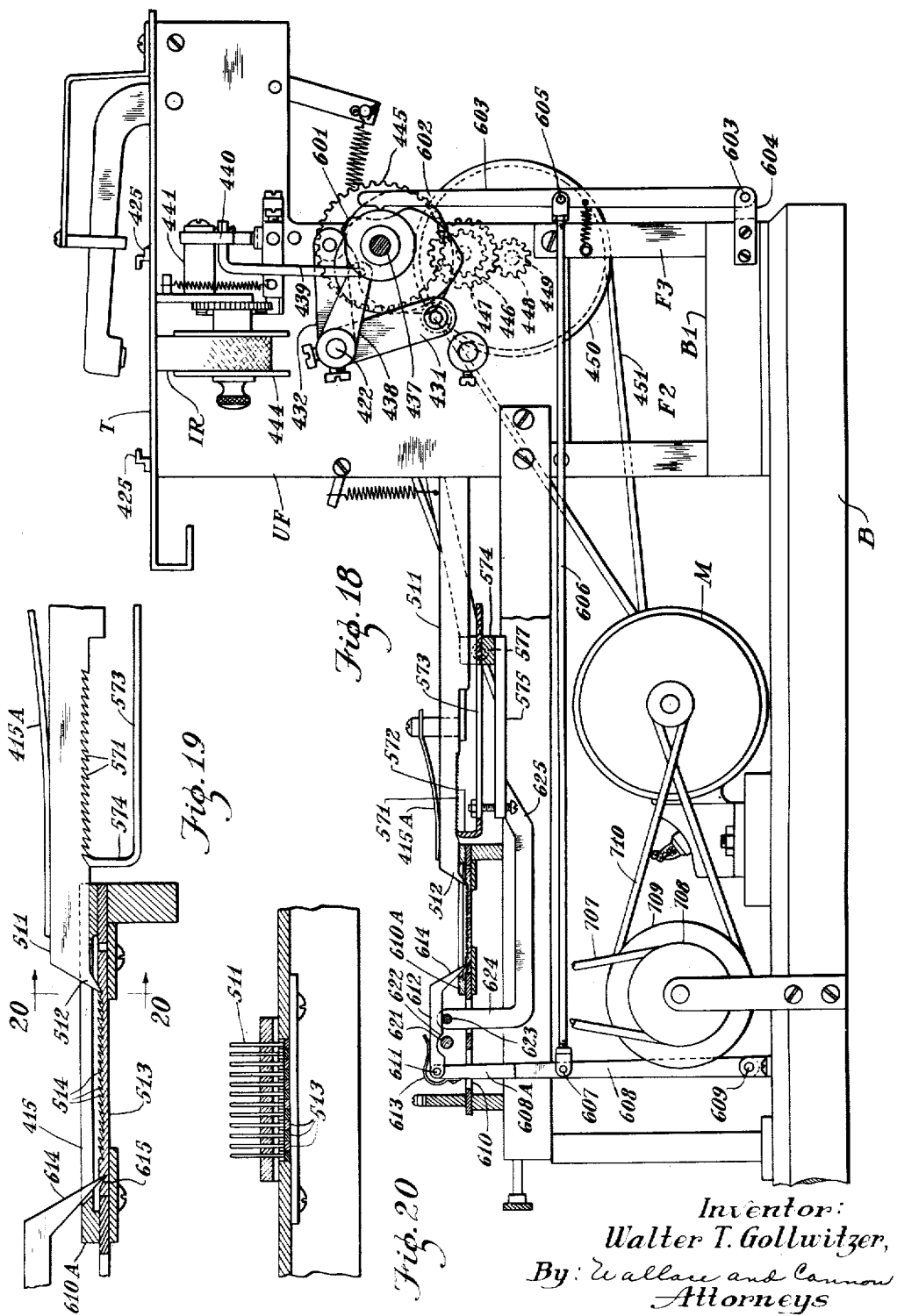
Inventor:
Walter T. Gollwitzer,
By: Wallace and Cannon
Attorneys May 23, 1950 W. T. GOLLWITZER 2,508,603
SENSING MECHANISM FOR RECORD CARDS AND THE LIKE
Filed April 19, 1946 11 Sheets-Sheet 10

Inventor:
Walter T. Gollwitzer,
By: Wallace and Cannon
Attorneys

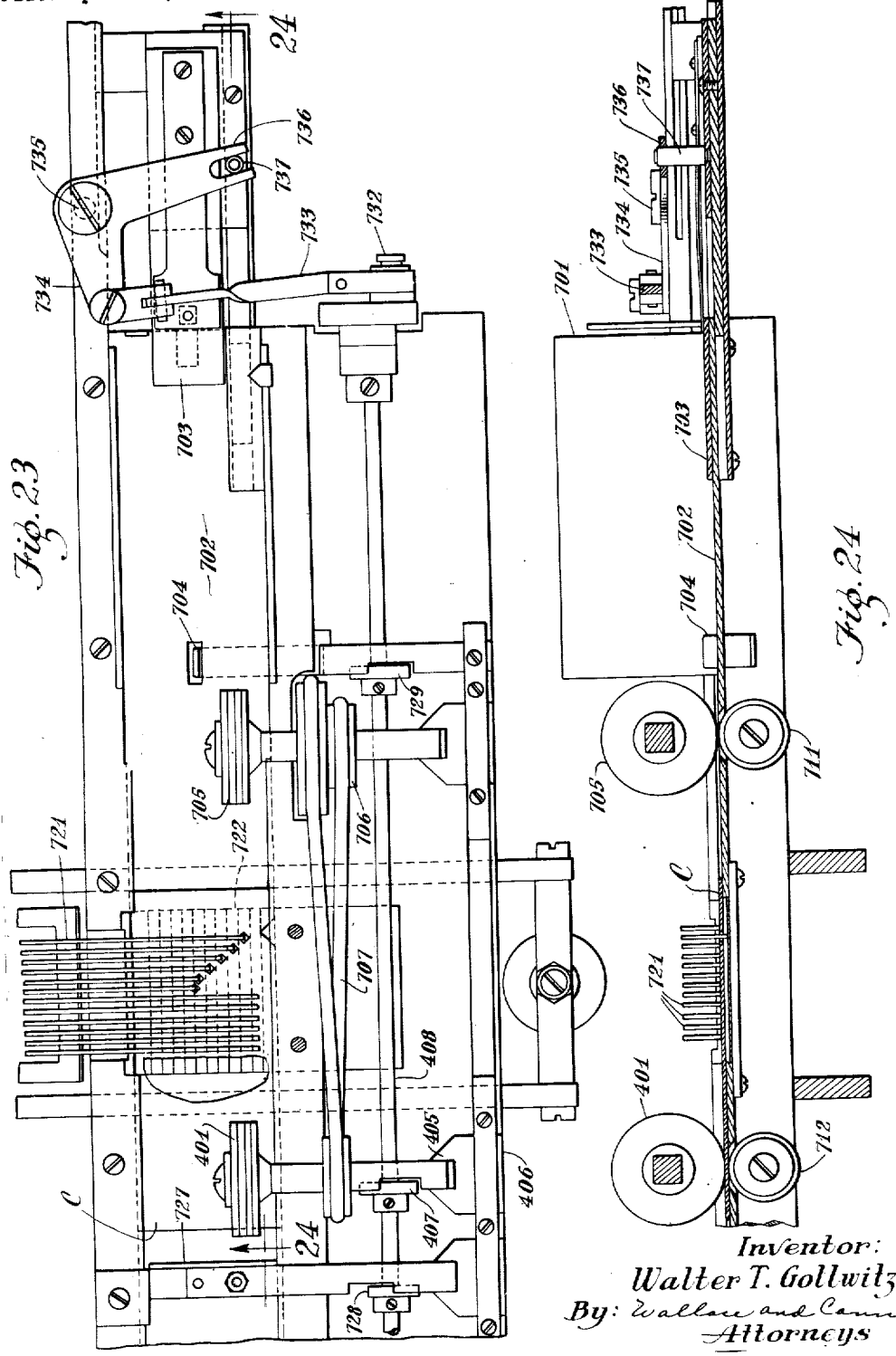

Patented May 23, 1950

2,508,603

UNITED STATES PATENT OFFICE 2,508,603

SENSING MECHANISM FOR RECORD CARDS
AND THE LIKE

Walter T. Gollwitzer, Euclid, Ohio, assignor to Addressograph-Multigraph Corporation, Wilmington, Del., a corporation of Delaware Application April 19, 1946, Serial No. 663,467

30 Claims. (Cl. 235—61.11)

This invention pertains to printing machines and particularly to machines which print and/or record data under the control of a series of control devices which are passed through the machine.

This application is a continuation in part, of my copending application Serial No. 423,119, now abandoned, filed December 15, 1941, which, in turn, is a division of my earlier application Serial No. 221,841, filed July 28, 1938, now issued as Patent No. 2,296,277, patented September 22, 1942. The present application is also a continuation in part of my copending application Serial No. 348,283, filed July 29, 1940, now issued as Patent No. 2,414,643, patented January 21, 1947, and it contains certain additional matter in elaboration and extension of the invention described in all said copending applications.

The present invention has to do particularly with improved sensing means, whereby data carried by control devices, or printing and control devices, may be sensed mechanically to initiate and/or control specific machine operations. It relates, more specifically, to sensing and selecting means whereby indicia represented by physical means such as perforations, protuberances, notches or other distinctively formed and located elements on a control device such as a plate, card, or the like, may be accurately and precisely sensed so as to initiate and/or control mechanical action to print, record, or make other use of such indicia. For example, data represented by distinctively placed or shaped indicia on a card or plate may be reproduced by printing mechanisms, accumulated or otherwise employed in a calculating or recording mechanism, or may be utilized to control the formation of other indicia such as perforations, in cards and the like, as in card punching machines and the like. In general, the broad purpose of my invention is to sense indicia which is necessarily placed or formed on a control member with only approximate accuracy, and to impose accurate limitations upon the sensing elements by which operations under control thereof must be performed with a high degree of accuracy.

By way of specific example, cards provided with perforations are frequently used to control the setting up of variable printing members, accumulators and the like. Thus, as more fully described in my aforesaid copending application Serial No. 423,119, such perforations are arranged according to a predetermined code and are sensed by mechanical means such as feelers, brushes and the like. It is in such instances essential that the representations of the data in the record bearing members be accurately and effectively sensed and utilized in order to enable and insure proper operation of the instrumentalities in the machine that are to operate in response to such representations, and to enable this to be accomplished in a novel manner is an important object of this invention.

A further object is to enable a sensing element to control the functioning of a settable element of an operative device such as a variable printer, accumulator or the like and to effect such functioning as an incident to movement of the sensing element across the face of a record bearing member. Objects relates to the foregoing are to enable a sensing element to be directly coupled with a member in an operative device such as a variable printer, accumulator or the like that is to be set up in pursuance of a sensing operation of the sensing element; to enable a sensing element or member, as an incident to the sensing of a particular representation on a record bearing member, to selectively assume an accurately determined position that is initially governed by the location of the sensed representation on the record bearing member and that is subsequently governed by accurately located orientation means that are effective on the sensing element; to so arrange the sensing element that it may move across the record bearing element until a representation on the element is encountered and also so that when a representation is encountered, the element may move angularly relative to the movement thereof across the record bearing member, as in a plane intersecting such member, and to utilize such movement angularly relative to the movement of the sensing element across the record bearing member to assure accurate positioning of the sensing element in a position related to the position assumed thereby when a representation is encountered on the record bearing member.

Variable data are customarily represented in record bearing or control members by perforations, protuberances, recesses or like indicia selectively disposed at predetermined positions thereon, such positions being selectively located in columnar relation and the movement that is imparted to the sensing member or element to effect a sensing operation is such as to cause the element to sense the positions in a particular column on the record bearing member. Hence, when a sensing element moves along such a column on the record bearing member and when a data representation is encountered such as a perforation, protuberance or the like, the sensing element may be caused to move under the characteristics of the representation as, for example, by passing into a perforation or riding over a protuberance, and among the objects of the present invention is to enable movement of a sensing element so occasioned to be utilized to insure disposition of the sensing element in an accurately determined location related to the location of the representation on the record bearing element, it being understood that the selective location of such a representation in a particular column on the record bearing member is determinative of the datum or data to be represented.

It will be appreciated that record bearing members will in the normal use thereof be sensed and that when such sensing is effected by physical engagement of a sensing element or elements with the data representations thereon, some deterioration of the record bearing member may arise as, for example, in the case of a record bearing member having perforations therein to afford data representations, there may be some tendency to increase the size of the perforation as a result of repeated seating in the perforations of sensing elements. Thus where the data representations are to be utilized to effect positioning of the sensing element in a selected location that is to thereafter determine the operation of an operative element such as a type bearing segment, the wheel of an accumulator or the like, it is desirable that the sensing element be accurately located irrespective of the condition of the data representations in a particular record bearing member being sensed. Moreover, where such positioning of a sensing element is to be determined by the location of data representations on a record bearing member operatively associated with the sensing elements, it is essential, in order to insure accurate positioning of the sensing elements that the record bearing member be accurately oriented relative thereto. However, because under operating conditions it is sometimes difficult to always obtain extremely accurate orientation of the record bearing members and in view of the deterioration to which data representations are subject in the course of repeated utilization thereof, it is an important object of the present invention to insure accurate location of the sensing elements in positions related to the positions assumed thereby in response to cooperation thereof with data representations, and objects related to the foregoing are to afford accurately located orientations that will be effective to accurately determine the positions assumed by sensing elements in locations related to data representations assumed thereby, and a related object is to enable such orientation to be effective as an incident to the sensing of data representations.

Heretofore data representations in record bearing members have been sensed by spring-pressed pins and like devices movable into engagement therewith and in other instances resort has been had to electrical means, for example in the form of brushes for the purpose of sensing data representations. In such instances, however, the operative device, such as a variable printer, accumulator or the like, which is to be operated in pursuance of the detection of data representations, has been indirectly connected to the sensing elements and sometimes the arrangement was such that a time delay intervened the sensing of data representations by a sensing element and the setup of an operative device in pursuance of the operation of the sensing element as determined by the cooperation thereof with data representations. In view of this, it is yet another object of this invention to enable operative devices such as the operative members in variable printers, accumulators and the like to be set up in pursuance of selectively located data representations by sensing elements, and a related object is to so arrange the sensing elements that they embody not only parts adapted for direct cooperation with the data representations but also so that they also embody parts operative to effect setup of operative members.

A more specific object of this invention is to provide a plurality of slides that may be utilized as sensing elements and to form such slides so that they embody parts adapted for direct cooperation with data representations such as perforations, protuberances and the like and also so that they will embody parts operative to effect setup of operative members in operative devices such as variable printers, accumulators and the like.

Other and further objects of the present invention will be apparent from the following description and claims and will be understood by reference to the accompanying drawings which, by way of illustration, show preferred embodiments and the principles thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 1 is an elevational view, with certain parts in section, showing part of a record controlled printing and data accumulating machine employing one form of my sensing device;

Fig. 2 is a fragmentary sectional view taken on the line 2—2, Fig. 1;

Figs. 3 and 4 are detail views showing one form of my sensing device in different positions with respect to a control device;

Fig. 5 is an illustration of a code under which data representations are formed in control devices employed in the apparatus illustrated herein;

Figs. 6 and 7 show control devices of a type which may be sensed by the sensing device shown in Figs. 1 to 4;

Fig. 11 is a side elevation of a printing machine embodying a further modified form of my sensing device, certain parts being shown in section;

Fig. 12 is a detail view on a larger scale of the sensing device and associated elements shown in Fig. 11;

Fig. 13 is a side elevation of a printing machine incorporating a further modified form of my sensing device;

Fig. 14 is a detail view on a larger scale of the sensing means and related elements shown in Fig. 13;

Fig. 15 is a detail sectional view similar to Fig. 14, with the parts in a different position and a card in position to be sensed;

Fig. 16 is another view similar to Fig. 14 showing the sensing element in still another position;

Fig. 16A is a detail view showing in elevation certain operating elements of the apparatus illustrated in Fig. 13;

Fig. 16B is a detail sectional view taken on the line 16B—16B on Fig. 16A;

Fig. 17 is an enlarged view showing part of the mechanism illustrated in Fig. 13 with the printing elements in various printing positions;

Fig. 18 is a side view of another modified form of my invention;

Fig. 19 is a detail view showing sensing means and related elements shown in Fig. 18 on a larger scale;

Fig. 20 is a sectional view taken substantially on the line 20—20 on Fig. 19;

Fig. 23 is a plan view showing means for feeding a control device to sensing position, as in the modifications shown in Figs. 13 and 18; and Fig. 24 is a sectional view taken along the line 24—24 on Fig. 23.

Figure 8:
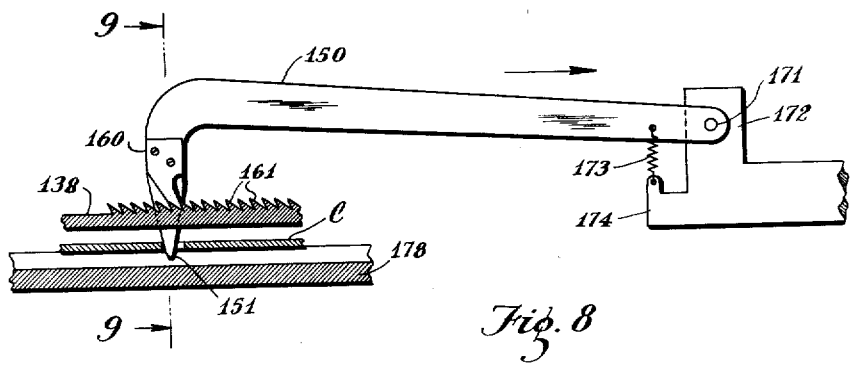
Fig. 8 is a detail view of an alternative form of sensing device.

Although the drawings show a number of forms of my sensing device and means by which it may be utilized it should be noted that in general a mechanical sensing device is utilized to move a locking element into position to become operative when detection of an indicium causes slight mechanical movement of the sensing elements. A locking device, associated with the sensing element, is thereby positioned for engagement with mechanical elements which are not subject to variations in dimensions and form as are control cards, perforations therein, and the like. All the various forms of sensing means described hereinafter thus insure precise and accurately controlled operations, although such operations are initiated by and are therefore under general control of indicia which is formed or located only with approximate accuracy.

Although the machine shown in Fig. 1 forms the subject matter of my aforesaid copending application Serial No. 423,119, a brief outline of its construction and operation will make possible a clearer understanding of the operation and function of the sensing means which constitutes the present invention.

A supporting frame 11 supports a shaft 12, driven cyclically or intermittently through a single revolution clutch in a manner described in my copending application. Shaft 12 carries a cam 13 which operates to move one end of a rocker 14 pivoted at 15 and urged into contact with the cam by a spring 16. The opposite end of rocker 14 carries a pin 17 adapted to move up and down in a slot provided in a vertical link 18. A spring 19 urges the link 18 downwardly, tending to keep the upper end of the slot in contact with the pin 17.

At its upper end link 19 is pivoted at 20 to one arm of a bell crank 21. Bell crank 21 is fixed to one end of a shaft 22 which carries an upstanding arm at its opposite end (not shown). The upstanding arm of bell crank 21 and the arm just mentioned operate in unison and carry between them a bail member 23 which is adapted to support a movable block 38 in various positions. Briefly stated, the block 38 is held in its highest position when it is desired to lift the sensing bars or elements out of card sensing position but to retain them momentarily in engagement with accurately positioned locking means borne by the block. In an intermediate position the sensing means may engage both the block and the card, whereas in a lower position, engagement between the block and the sensing means is prevented, for example, when totalizing operations are performed as described more fully in my aforesaid copending application. The latch 26 which locks tooth 29 on bell crank 21 compels the bell crank to rotate counterclockwise with a key operated lever in such a case. Otherwise the bell crank is oscillated to move the block from the intermediate to the higher position and vice versa in normal operation of the machine, this being accomplished by the link 18, rocker 14 and the other parts described above.

The shaft 12 carries another cam 31 which operates on a follower 32 of an arm fixed to a shaft 33. Two other parallel arms 34, fixed to the same shaft, carry a restoring bail 35 at their upper ends to restore the sensing bars 50, described in detail below, to their initial positions after a sensing operation.

As shown in the upper left part of Fig. 1, a card feeding means 36 is provided for moving control cards C to sensing position. Stop means to retain the cards in such position during sensing, and feed-out means for carrying the cards away after they have been sensed, are described in detail in my aforesaid copending application and are illustrated only generally in Fig. 1 hereof.

In Fig. 1, also Figs. 3, 4 and 8 to 10, a sensing means 50 is shown which comprises a slidable bar provided at its forward end with a sensing tooth 51. Farther to the right, as viewed in Fig. 3, the bar carries a block or lug 52 bearing a locking tooth 60 which is adapted to engage any one of a series of undercut teeth 61 on the block member 38 previously mentioned. These teeth are accurately formed and the block 38 which bears them is accurately mounted in the machine. The undercut teeth 61 hold the locking tooth 60 in interlocking engagement until the sensing bar 50 is moved positively to the left, as viewed in Fig. 3, in a restoring operation.

Near its rear end the sensing bar 50 is enlarged in width to provide a slot 83 for guiding purposes and the enlarged part has rack elements 129 and 120 on its upper and lower edges, respectively. The rack 129 meshes with the teeth of a gear sector 130 which is mounted above the bar 50 on a shaft not shown herein. As described in my copending application, Serial No. 423,119, the sector 130 carries a series of printing characters which are adapted to be positioned selectively in printing position. Such selective positioning depends on the angle through which the sector 130 is rotated which, in turn, depends upon the position assumed by the slidable sensing bar 50.

A slot 83 on the sensing bar 50 rides upon a rod 84, thus mounting the bar 50 for sliding and pivotal movement in a vertical plane about such rod.

Although in the above description reference has been made to a single bar 50, sector 130, etc., it will be understood that normally a series of such bars, sectors, etc., will be utilized, as described in my aforesaid copending application. Since their operation is identical, however, the description herein is limited, in general, to the construction of a single unit or assembly. The number of bars and associated elements employed obviously is governed by the number of lines or rows of data or indicia to be sensed on the control device.

Each sensing bar, then, is adapted to sense indicia located on a control device along a path to be traversed by the sensing tooth 51. Where, as shown in this embodiment of my invention, the indicia consists of perforations in a card, sensing is accomplished by moving the sensing device across the surface of the card until the tooth 51 drops through a perforation. Movement thus imparted to the bar 50 about the pivot point at rod 84 is in a vertical or substantially vertical plane, or, in other words, in a plane intersecting the surface of the card. Hence sensing movement consists in (1) movement along the surface of the card until an indicia is encountered and (2) movement in a plane intersecting said surface upon contacting the indicia. It will be understood that the indicia may be a protuberance, tab, notch, or the like, instead of a perforation, if desired.

The card or control device C, as shown in Fig. 6, may embody a group of perforations arranged according to the code of Fig. 5. Thus, as shown in Fig. 6, the card bears a perforation representing the numeral "1" in the first or units column, a "0" in the tens column, another "0" in the hundreds column and an "8," "9" and "9," respectively, in the next three columns. Fig. 7 shows the same card inverted for direct reading, the data represented by the perforations, or indicia, being 998001 or $9980.01.

Cards such as C are fed to sensing position, by means mentioned above, over a grooved block member 78. As shown in Fig. 2 a card C is sensed simultaneously by a number of sensing bars 50, one sensing bar being provided for each column to be sensed. Under the influence of springs 131, connected to gear sectors 130, the sensing bars 50 move to the right, as viewed in Fig. 1, when the bail 35 moves in clockwise direction, as viewed in Fig. 1, under control of the cam 31 which is set in rotation when a sensing operation is to be effected. The sensing tooth 51 on each sensing bar drags lightly along the column being sensed on card C until it encounters a perforation therein. Thereupon the tooth drops into and through the perforation, into a groove in the upper surface of the block 78.

The dropping of tooth 51 through a perforation in card C allows the sensing bar 50 to pivot counterclockwise, as viewed in Fig. 1, about shaft 84. During a sensing operation the movable block 38 is in the position shown in Fig. 3, with the tooth 60 just clearing undercut teeth as 61 on the block 38. As soon as the tooth 51 drops through a perforation, tooth 60 engages an undercut tooth 61 to stop movement of the bar 50 to the right, as viewed in Fig. 1. Moreover, because of the undercutting of the teeth 61, and under the influence of a spring as 131, the tooth 60 fully and firmly seats in the tooth 61 into which it passes, as aforesaid. This positively and accurately limits movement of the bar 50 and consequently positions the gear sector 131 which carries printing characters (not shown) so as to present the selected of said printing characters accurately in printing position. The block 38, being accurately positioned and having its undercut teeth 61 accurately machined therein, thus serves to control the setting of a printing member with a high degree of precision, even though the card C is not perforated with high precision or even if the perforation has been worn or enlarged through repeated use. The teeth 61 on block 38 are preferably so located with respect to the card being sensed that in normal sensing the tooth 60 may drop a slight distance to the left, as viewed in Fig. 1, of the tooth 61 to be engaged thereby. Any inaccuracy in the card C, which is not so great as to permit tooth 60 to engage a wrong tooth 61, thus has no effect on the accuracy with which the bars 50 and printing wheels controlled thereby are set.

Fig. 4 shows the block 38 raised somewhat higher than shown in Fig. 3, to retain the bar 50 in the position sensed, the sensing tooth 51, however, being lifted out of the perforation in the previously sensed card to permit removal of such card and feeding in of a new card. The bail 23 which lifts block 38 to this position is actuated by means described briefly above.

In addition to setting printing members in printing position, sensing bars 50 may be used to control the setting of accumulator wheels, as more fully described in my aforesaid Patent No. 2,296,277 and in my copending application Serial No. 423,119. By means not described fully herein but shown in part in Fig. 1, an accumulator wheel 106 is mounted on a shaft 107 carried by two arms pivoted on a shaft 110. The accumulator wheel is periodically raised by cam means on a shaft 116 to engage the teeth thereon with the teeth of a rack as 120 formed on the lower edge of each sensing bar.

When the sensing bar 50 is restored by bail 35 from the position sensed to its initial or zero position, the accumulator wheel 106 is thereby moved, by means of rack 120, a distance representative of the digit sensed. After full restoration of the sensing bar to zero position, shown in Fig. 1, the accumulator wheel is lowered out of mesh with rack 120. In the construction shown, movement of a sensing bar 50 to the right to sensing position thus sets up a printing member to print the number sensed. Restoring movement, to the left, to zero position, sets the number sensed into an accumulator.

It will be apparent that devices other than printing members and accumulators, such, for example, as calculating devices, punching machines, selectors and the like could be controlled by the sensing means described if desired.

Figure 9:
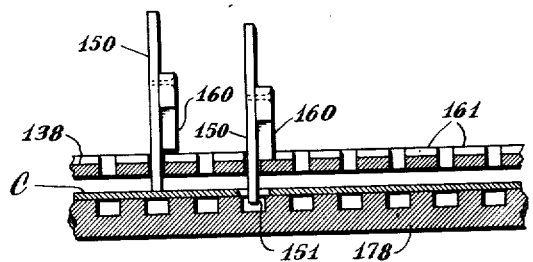
Fig. 9 is a detail end view, with certain parts in section of the sensing device and associated parts shown in Fig. 8.

Referring now to Figs. 8 and 9, a modified form of sensing device 150 is shown which, for some purposes, is preferred because of its direct and positive action. It will be understood that the sensing bar 150 may be used in lieu of the bars 50, Fig. 1, for identical functions, or for analogous purposes, and for this reason I have not shown details such as racks, gears and other operating parts associated therewith. The sensing bar 150 may be integral with rack portions such as 120, 129, Figs. 1, 3 and 4, if desired. As shown, however, in Fig. 8, the sensing bar may be a relatively light member pivoted at 171 to a slidable member 172 which carries rack members or other operating elements. The sensing bar 150 is urged counterclockwise as viewed in Fig. 8, for sensing purposes, by a light spring 173 connected to the bar and to a lug 174 on the member 172.

The card C or similar control device is placed in sensing position by any suitable means over a grooved block 178 generally similar to the block 78 in Fig. 1. The free end of bar 150 carries a sensing tooth 151 adapted to sense a perforation in the control device as the sensing bar is moved across the control device and drops through such perforation into an underlying groove in block 178, see Fig. 9. Adjacent the sensing tooth 151 is a locking tooth 160 adapted to engage an undercut tooth 161 on a block 138 to positively and accurately position the sensing bar and the operating elements, not shown, which are positioned thereby. As in the case of the sensing bar 50, described above, minor inaccuracies in the position of the perforation in the card or control device C do not interfere with accurate control of operations initiated by the sensing operation of the sensing element 150. In effect, an approximately accurate control device is thus sensed so as to initiate a very accurately controlled operation.

Figure 10:
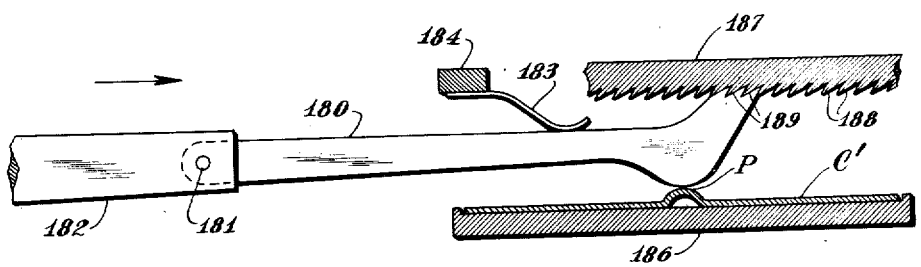
Fig. 10 is a detail view of another form of sensing device.

Referring now to Fig. 10, another form of my sensing device is shown at 180. As in the case of sensing bar 150, the sensing device 180 may be a relatively light member pivoted at 181 to a control member 182. Instead of a card C, provided with perforations, another form of control device C' is shown, Fig. 10, which may be a card, metal plate, or the like, provided with indicia in the form of protuberances P which may, for example, be embossed thereon. A spring 183, mounted on a fixed support as 184, urges the sensing end of the bar 180 against the control member and during a sensing operation the sensing device is moved to the right, as viewed in Fig. 10, and relatively to the control device by means not shown. Instead of a tooth such as 51 or 151, described above, the sensing element of bar 180 may be a slightly raised and rounded surface on the bottom of the sensing head, adapted to slide freely across the control device without causing material wear or abrasion thereof. The control device C' is supported in sensing position by an appropriate support or backing member 186. A block 187 having undercut teeth 188 is provided to stop the sensing means in accurately located stop positions. The sensing device includes a toothed portion 189 adapted to engage the undercut teeth 188 immediately after the sensing element is rocked slightly by protuberance as P on the control device and thereafter, under influence of the means effective to move the sensing device across the control device, and by reason of the undercutting of the teeth 188, the toothed portion 189 is, in effect, cammed into full seating in the teeth 188 whereupon movement of the bar 180 with respect to the locking teeth 188 is arrested and the bar 180 is disposed in an accurate position. In this arrangement the parts may be relatively very small and light.

The arrangement just described, like that shown in Fig. 8, has the advantage that any motion transverse to the length of the sensing bar, which is incident to the actual sensing operation, is simultaneously imparted in an equal degree to the teeth 189. If clearance is small between the teeth 189 and locking teeth 188, locking engagement occurs practically instantaneously when an indicium is sensed. By making the parts light, properly proportioning the teeth 188, 189, and keeping the clearance between the teeth 188 and 189 small, for example, of the order of a few thousandths of an inch, it has been found that this form of my invention may be used for very rapid operations. The device shown in Fig. 10 may be used in the same manner as the forms previously described to control various operations such as printing or accumulating variable data from a control device, setting up elements of a calculator, controlling calculator operations, punching apparatus, and the like.

As shown in Fig. 10, the sensing bar 180 is provided with a plurality of locking teeth 189 which are adapted to engage the undercut teeth 188. By the use of a plurality of teeth, the locking teeth on both the sensing element and the block 187 may be made very small without sacrificing necessary strength and the associated parts may be made proportionately small and light. This makes possible the use of very light parts having small inertia and capable of rapid operation. If desired, other forms of my invention disclosed herein might also make use of a plurality of small teeth instead of a single relatively large locking tooth.

Fig. 11 gives a general view of a printing machine in which another form of my invention may be used, this figure corresponding to Fig. 3 of my aforesaid copending application Serial No. 348,283. By means of a motor, appropriate gearing, and a single revolution clutch, described in the last mentioned copending application, a transverse shaft 1600 is operated cyclically to perform various operations. The shaft 1600 carries several cams which control elements of the printing and accumulating mechanisms and it also carries a gear 216 which drives another gear 215 twice its diameter. Gear 215 is mounted on a shaft which also carries bevel gearing to drive a horizontal shaft 204 which extends forwardly of the machine. Near its front end shaft 204 carries a bevel gear 208 meshing with a similar gear 207 on a vertical shaft 201. By means of bevel gearing the shaft 201 drives a horizontal transverse shaft 195 which operates a feeding device, not shown herein, to advance cards from a magazine to a sensing position. A series of parallel sensing bars 229 are afforded for sensing data on a control card that is fed to a control or sensing position in the machine and certain of these sensing bars 229 sense variable data such as a money amount which is set up and may be printed, while other of the sensing elements 229 sense identifying data on the card such as a control number, and as described in my aforesaid copending application, Serial No. 348,283, such identifying data is compared with similar identifying data on a printing and control device, and operation of the machine is stopped in the event that such identifying data do not correspond.

Description of the operation of one sensing bar will illustrate the operation of all. As more fully described in my aforesaid copending application and as shown in Fig. 12, the sensing device 229 has its sensing element 230 disposed between the pivot point, shown as a rounded projection 254 resting on a plate 255, and the selecting means 295, so that a relatively small movement of the selector 230, as through a perforation in a card, results in a greater movement of selecting means 295. As pointed out in the application just referred to, the sensing bars 229 are made of thin material and are supported in edgewise position by suitable combs not shown herein which hold them in properly spaced relation.

The sensing points or teeth 230 of bars 229 project downwardly into corresponding slots 258 in a guide plate 257 to be accurately guided thereby in the course of sliding movement. The sensing bars 229 are arranged to slide across the face of a card which may be disposed therebelow in the space between the guide plate 257 and the surface of the bed plate 383. The plate 257 is provided with suitable openings to enable electrical sensing brushes 231 to engage the card and complete electrical circuits through perforations therein for control purposes which are explained in detail in my aforesaid copending application.

The sensing bars 229 rest on a roller 259 which is rotatably mounted on a rod or shaft 260 carried by two vertical posts 261, a recess being provided in bed plate 383 directly beneath the roller 259 to allow clearance for the roller. The posts 261 extend through openings in the bed plate 383 and carry rollers 262 at their lower ends which bear upon arms 263 mounted on a shaft 264. Compression springs 265 urge these posts into engagement with the levers 263.

A rod 242 connects the opposite ends 267 of levers 263 to a link 241 which connects to a rocker arm 243 mounted on a transverse shaft 244 and operated by a cam on the shaft 1600. The rod 242 also connects link 241 to arms 240 of rockers 238 mounted on a shaft 239. The rockers 238 carry a roller 237 which is adapted to support a plate 236 carrying upwardly projecting pins 233 which carry the plate 232 and the assembly of electrical sensing brushes 231 which sense the perforations in the card, as previously mentioned. Hence operation of rocker 243 to raise or lower the roller 259 and the sensing bars 229 likewise raises or lowers the electrical sensing brush assembly 231. Springs 247 surrounding pins 233 urge the plate 236 downwardly at all times and a tension spring 246 keeps the rocker 243 in contact with its operating cam.

The sensing bars 229 are individually urged at all times to slide to the right by pivoted arms 282 which are constantly urged counterclockwise as viewed in Fig. 11, by spring 283. A restoring bail 280 periodically moves the sensing bars 229 to their zero positions in which they are shown in Figs. 11 and 12. When the restoring bail, operated by means not shown herein in detail, is withdrawn to the right, as viewed in Fig. 11, the sensing bars follow it, sliding the sensing points 230 over the surface of a card, provided a card is in sensing position and provided the bars are not locked by latch means which will next be described.

Bars 268, attached to side frames 1560 of the machine, project horizontally over the bed plate 383 and above the sensing bars 229. A cross bar 269 is rigidly secured to the bars 268 and carries comb springs 270 which urge the individual bars 229 downwardly, or counterclockwise, as viewed in Fig. 12, with respect to the rounded pivotal portions 254 which rest on the supporting plate 255. Each of the sensing bars 229 is serrated along its upper edge near its front end to provide a series of teeth 271. A series of lock pawls 272, one for each sensing bar 229, is mounted on a rock shaft 273 extending between and carried by the bars 268. A rocking member 275, secured non-rotatably to the shaft 273, carries comb springs 274 which urge the individual lock pawls 272 downwardly. Arms 277 of the rocking member 275 carry a bail 276 which lifts and holds the pawls 272 out of engagement with the sensing bar 229 when the rocker 275 is in its extreme clockwise position as viewed in and where it is shown in Fig. 12. The positioning of rocker 275 to engage the pawls 272 with the sensing bars is controlled by the variable printing unit B, not shown in detail but comprising printing wheels 364 mounted on a shaft 365 and a platen 361 mounted on pivoted arms 367, Fig. 11. The control elements are described in detail in my aforesaid copending application Serial No. 348,283.

During a card sensing operation, the bail 280 is withdrawn to the right, as viewed in Fig. 12, and the sensing bars 229 follow it, being urged to do so by spring tensioned arms 282. When the sensing point 230 encounters a perforation in a card, the bar drops, or rotates counterclockwise, as viewed in this figure, and the tooth 295 near the front end of the bar engages the next tooth 303 to the right on a toothed bar 302. Each of the bars 302 is mounted for limited sliding motion to the right, as viewed in Fig. 12, against a light spring 304 but its final position is accurately limited by the end of the block or plate member 383. This small sliding movement permits switches 300 to be closed for a purpose to be described below. A bar 302 is mounted directly below each sensing bar 229 and the engagement of the tooth 295 with an undercut tooth 303, and the final abutment of bar 303 against plate 383 stops the movement of the sensing bar at an accurately located position, even though the perforation sensed in the card is elongated, enlarged, or slightly misplaced.

The various bars 229 are thus stopped in various accurately located positions, being locked by engagement of undercut teeth 295 and 303. To retain the sensing bars in these positions while they are raised to permit card feeding and other operations to begin anew, the shaft 273 carrying arms 277 and bail 276 is rotated counterclockwise, as viewed in Fig. 12, by means not shown in detail herein, to allow springs 274 to urge latches 272 into locking position.

As described in my aforesaid copending application Serial No. 348,283, the printing apparatus B is designed to print variable data, such as numerical data represented by perforations in cards which not only are sensed by my sensing means 229, 230, but are also sensed for the purpose of comparing indicia borne thereby with data borne by a printing and control device which is being simultaneously passed through the machine. This sensing is done by the electrical brushes 231. Immediately after the variable data are printed, under the control of the card, changeable data, such as names and addresses, are to be printed on the same document which received the variable data. The changeable data are printed by means of the printing and control devices just mentioned which may bear control indicia such as an account number or the like. The cards sensed by sensing bars 229 also carry the account number and are sensed simultaneously with the sensing of the printing and control devices to determine that the two control instruments which are fed from separate sources, are properly matched. In other words, while the card C is being sensed to set up the printing means in the apparatus B for printing the first line of variable data v upon the sheet s, as described in my aforesaid copending application, Serial No. 348,283, the account number represented on this card is compared with the account number represented on an identification card of the printing and control device in detecting position in the main machine. In the event of non-matching of the two account numbers, only one line of the variable data is printed, and further automatic operation of the machine is suspended until this condition is rectified, but if the account numbers are in agreement, automatic operation continues.

Assuming the machine is set for operation, with a card fed into sensing position beneath sensing bars 229 and brushes 231, the electrical sensing brushes 231 are lowered into sensing position by properly timed movement of the rocker 243. This same operation lowers roller 259 and hence sensing bars 229 to sensing position. The bail 280 next moves to the right, as viewed in Fig. 12, and the sensing bars 229 follow until their sensing points 230 detect the presence of perforations in the several columns of the card. Type wheels 364 rotate with movement of the sensing bars until the bars drop and engage the tooth 295 with an undercut tooth 303 on the bar 302. Upon such engagement, the sensing bar 229 pulls the bar 302, now locked thereto, a short distance to the right, as viewed in Fig. 12, compressing the small spring 304 and closing an electric switch 300 associated with each bar 302. The time in the sensing cycle at which the switch 300 is thus closed determines the digit which will be presented in printing position by the associated printing wheel 364, electrical control means for this purpose being described in detail in my aforesaid copending application Serial No. 348,283. Briefly the means for determining the positioning of the printing wheels 364 are solenoid controlled pawls 393, Fig. 11, which are drawn counterclockwise, as viewed in Fig. 11 against the force of springs to engage an appropriate tooth 391 on each type wheel 364. The type wheels are thus stopped against further rotation imparted to them by rack, gear and spring means shown in part in Fig. 11 but not described herein. Printing is effected by means described fully in the aforesaid copending application Serial No. 348,283, and the wheels 364 are subsequently restored to their initial positions.

The approximate positioning of a perforation in a card and its sensing by my sensing means thus makes possible the very accurate positioning of a printing member. In the modification just described the positioning means for the printing members includes electrical as well as mechanical means, but the operation of the sensing means itself to accurately position a mechanical element which in turn controls the electrical circuit is merely another phase of my generic invention.

Fig. 13 shows still another modification where the principles of my invention are applicable. In this instance control devices, such as perforated cards or the like, which are to be sensed are fed one after another from a supply source by means including a feed roller driven by a pulley 402 which in turn, is driven by a belt 403. Both the feed wheel and the pulley are mounted on a shaft carried by a bracket 404, the front end, Fig. 13, of which is carried by a leaf spring 405 secured to a frame member 406, see also Fig. 23. A cam 407 is carried by a shaft 408 which is rotated by means not shown in timed relation to the feeding of control devices, such as cards C2 to sensing position. Cards C2 may be of conventional types or they may be very small cards bearing concentrated data which is formed therein by a suitable punching mechanism such as that disclosed in copending application Serial No. 648,075, filed February 16, 1946, by the present inventor and John H. Gruver. At suitable intervals the cam 407 lowers the feed roller 401 into feeding relation with a card which has been advanced thereto by means shown in Figs. 23 and 24 that are described in detail in my copending application Serial No. 672,581, filed May 27, 1946. In addition to the feed roller, certain other elements of the mechanism are driven by belts from an electric motor M, mounted in a base member B which supports a pair of vertical front frame members F1, intermediate frame members F2 and rear frame members F3. An upper frame member UF, carried by one of each pair of the three pairs of vertical frame members, forms the framework which supports the sensing mechanism and associated elements now to be described.

In the form shown in Figs. 13 to 17, my invention comprises a series of sensing bars 411 each of which is mounted for longitudinal sliding movement to push a sensing tooth 412 over the face of the card C2 being sensed. A description of the functioning of one sensing bar and associated mechanisms will suffice, generally, for a description of all.

Beneath the card C2 is a supporting plate 413 having a serrated upper surface comprising sharp undercut ridges or ribs 414 running transversely thereof. Upon sensing a perforation in the card C2, the tooth 412 drops through the perforation and comes into engagement with the underlying rib 414 in its advancing movement. The advancing movement is thereupon stopped in an accurately located position.

The sliding sensing bar is guided at its forward or sensing end by a slot in a plate 415 through which the sensing nose of the bar projects. The plate 415 is spaced above the serrated plate 413 a distance sufficient to permit feeding of a control device such as card C2 therebetween. A light leaf spring 415A holds the sensing bar down in sensing position.

The rear end of sensing bar 411 is offset downwardly and bears an open enlarged section 416 bearing a rack 417 on the upper edge thereof. This enlarged portion is supported for reciprocal movement by a grooved roller 418 carried by a shaft 419 extending between the upper side frame members UF. The rack portion 417 is engaged with a toothed gear sector 421 mounted on a transverse shaft 422 also supported by the frame members UF. Suitable side guides, not shown, are provided to guide the sensing bar in its reciprocation and to keep the rack 417 aligned and in mesh with the sector 421. It will be understood that a gear sector as 421 is associated with each sensing bar, appropriate spacing means 421A being mounted on the shaft 422 to hold the sectors 421 in proper position.

Integral with gear sector 421 is a type sector 423 comprising a series of printing characters which are selectively positionable under an inked ribbon IR and in printing position beneath a platen element 424. A table surface T overlies the printing sectors and is positioned beneath the platen elements 424. Sheets to be printed are fed along said table by means not shown herein, suitable guides for such sheets being shown at 425. A tension spring 426 extends between each type sector and a transverse rod 427 carried by arms 428 pivoted on shaft 422. This spring obviously tends to rock the sector 421 clockwise, as viewed in Fig. 13, about shaft 422 and to move the sensing member to the left, as viewed in Fig. 13, unless restrained from doing so.

The arms 428 which carry the rod 427 also carry a restoring bail 429. These arms are fixed to the shaft 422 so as to rotate therewith. As best shown in Fig. 16A, the shaft 422 extends through suitable bearings in the upper side frame members UF and the front or right end, as viewed in Fig. 16B, thereof has fixed thereto two arms 431 and 432 which carry at their ends cam followers such as rollers 433 and 434. A pair of conjugate cams 435 and 436 are carried by a shaft 437 which also is mounted in bearings in the side frames. By the means just described the arms 428 are rocked counterclockwise, as viewed in Fig. 16A, at an appropriate time after sensing and printing operations have been completed, to restore the printing sectors and the sensing bars to their initial positions. For an ensuing operation, the arms are rocked in a clockwise direction, as viewed in Fig. 16, to permit tension of the springs 426 to move the sensing bars across a new card or control device C2 which, meanwhile, has been moved into sensing position by the card feeding means.

An arm 438 is fixed to the outer end of shaft 422 to rock therewith and, as shown in Fig. 16A, this arm is connected to the lower end of a vertically extending link 439, the upper end of which connects to an arm 440. The arm 440 is fixed to a rock shaft, not shown, extending forwardly of the machine through a suitable bearing 441. The forward end of the rock shaft carries an arm and a pawl 442 which engages the ratchet 443 to advance a winding reel 444 for the inked ribbon IR. Two such reels and pawls, together with suitable reversing means, are provided and arranged as is well known in the art.

The shaft 437, as best shown in Fig. 18, and as shown in part in Fig. 16A, has fixed thereto a gear 445 which is driven by a small gear 446 mounted on a suitable jack shaft. Another gear 447, fixed to gear 446, is driven by a small gear 448 mounted on a shaft 449. A pulley 450 is also mounted on shaft 449 and fixed to the gear 448 for rotation therewith. Pulley 450 is driven by a motor as M, by a belt 451. The drive mechanism just described is identical in Figs. 16A and 18, the latter figure, however, embodying certain modifications in the sensing mechanism which will be described more fully hereinafter.

The printing platen 424, mentioned above, is operated after the type sectors 423 have been selectively positioned by the sensing means. An individual platen element carried by an individual arm 452 is provided for each printing sector and means now to be described are arranged to operate all such platen elements simultaneously.

Referring to Fig. 17 of the drawings, each of the arms 452 which carries a platen element 424 is pivotally supported on a shaft 453 extending between and supported by the frame members UF. These arms constitute the upper parts of bell cranks, the lower arms 454 of which extend forwardly and somewhat downwardly from the shaft 453. A strong spring 455 is secured to each arm 454 and the opposite end of each spring is secured to a transverse shaft 456 which is suitably mounted in the framework of the machine. A guide means to keep the platen arms properly spaced laterally is provided in the form of an overhead comb 452A carried by a suitable bracket 452B.

A pair of spaced arms 457 carry a platen restoring bail 458, said arms being supported by and secured for rotation with a rock shaft 459 suitably mounted in the side frames UF. One of the arms 457 constitutes the upper part of a bell crank, the other arm 461 of which comprises a cam follower. A cam 462 is secured to the cam shaft 437 and the cam surface thereof comprises an abrupt recess or drop 463 which permits the cam follower 461 to rock counterclockwise, as viewed in Fig. 17, very quickly. When this occurs, the springs 455 draw the platens 424 down to strike the paper (not shown) against the ink ribbon IR and record an impression from the type characters presented in printing position by the sectors 423 under the control of the sensing means which, obviously, are controlled by perforations in the cards C2 being sensed.

Subsequently to the printing operation just described, cam 462 continues to rotate clockwise, as viewed in Fig. 17, to restore the platens to their normal raised positions as shown in Fig. 13, against the force of springs 455 which are thereby tensioned.

A slot 464 is provided in each of the frame members UF, through which the ends of the platen restoring bail 458 project. A pair of locking arms 465 are mounted on and secured to the shaft 456, previously mentioned, each arm comprising a locking notch 466 adapted to engage the extended end portion of the bail 458. One of these arms is integral with a depending arm 467, as best shown in Fig. 13, to which is connected a spring 468 and a push rod 469 extending to the front of the machine and terminating in a knob 470. In case it is desired to render the printing mechanism inoperative, the knob 470 is pushed inwardly to rock the arm 467 counterclockwise as viewed in and into the dotted line position shown in Fig. 13. In this position the notches 466 engage the extended ends of the bail member 458 and prevent the platens from being operated even though the cam 462 continues to rotate. The spring 468 of course normally holds the locking means in inoperative position.

In order to retain the sensing bars 411 in the sensing position thereof while printing is being accomplished, it is desirable to provide a holding means other than the serrated plate 413. This will permit a new card or control device C2 to be advanced into sensing position while other operations incident to the previous sensing are still being accomplished.

Accordingly each of the sensing bars 411 is provided with a series of undercut locking teeth 471 which are spaced precisely the same distance apart as the teeth 414 on the serrated plate 413. A locking bar or plate 472 having a sharp and inclined upper edge is adapted to be raised into locking engagement with the teeth 471. As shown, this bar or plate consists of the upturned forward end of a plate 473, the rear portion of which is secured to a bar 474 extending transversely under the sensing bars 411. The bar 474 carries a rigid forwardly extending plate 475, the forward end of which bears upon an adjusting screw 476, the upper end of which is secured to the locking plate. By adjustment of the screw 476, the locking plate which is relatively flexible may be adjusted toward and away from the teeth 471 to afford the desired clearance.

The bar 474 is pivotally mounted at 477, Fig. 13, for rocking movement and it has secured thereto a rearwardly extending rocker arm 478. Near the rear end of arm 478, Fig. 13, a notch 479 having an abrupt shoulder 481 is provided. This shoulder constitutes a cam follower for a cam 482, carried by cam shaft 437 which, as previously noted, rotates clockwise as viewed in Fig. 13. The cam 482 also has an abrupt shoulder or drop which permits the locking plate 472 to be quickly withdrawn from locking engagement with the teeth 471 on the sensing bars. A spring 483 holds the rocker arm cam follower in engagement with the cam 482 at all times.

Figs. 18 to 22, inclusive, show another form of my invention which is similar in many respects to that just described in connection with Figs. 13 to 17, inclusive. Many elements are identical and where this is the case the same reference characters have been used or this identify is mentioned. Thus in Fig. 18, the supporting framework for the machine, the drive mechanism and the platen operating means are all identical with corresponding parts shown in Figs. 13 to 17.

In the embodiment shown in Figs. 13 to 17 the printing sectors 423 have relatively few printing characters thereon, ten being shown. This number is sufficient for printing numerical data according to the decimal system, but if data employing the letters of the alphabet are to be printed, a large number of characters must be employed, twenty-six if only one case of alphabetic characters is to be used. If a combination of alphabetical and numerical data is to be printed a still larger number of characters must be provided.

Accordingly, printing sectors or segments 523, are made with a larger radius and a larger circumferential extent than the corresponding sectors 423 previously described and the gear sector or segments 521 are made shorter radially, but somewhat more extensive circumferentially than the corresponding sectors 421 previously described. As a result of this construction relatively small movements of a sensing bar as 511 are required to move the type segment so as to dispose consecutive printing characters in printing position.

There is a practical lower limit to the spacing which may be made between the teeth or ribs 514 on the serrated plate 513, corresponding in function to plate 413 previously described, but divided into separate sections as described below, and likewise there is a practical lower limit to the spacing between locking teeth 571 on the sensing bars 511. There are limitations, also, on the length and spacing of perforations in cards. Hence it may not always be possible to sense as many possible index positions as there are type characters since a construction adapted to move the type segment only one character would have extremely fine and closely spaced locking teeth and index positions. With the construction shown the motion imparted to the gear segment 521 is multiplied three or four times in motion of the printing surface. Positioning and locking teeth of such fineness would be deficient in structural strength, resistance to wear, and maintenance of the high degree of accuracy required.

Therefore, means are provided for selectively moving the serrated positioning elements 513 and the locking plates 572 distances corresponding to half the space between teeth which are twice as large as otherwise would be required. The teeth 514 on the serrated plates 513 and the teeth 571 on the sensing bars, Figs. 18 to 21, therefore are relatively large so that movement of a sensing bar a distance equal to the spacing between consecutive teeth results in moving the type sector 523 a distance equal to the spacing between alternate printing characters. To dispose characters between in printing position the whole sensing mechanism is moved a half space.

Means for moving the sensing mechanism half a space comprise a cam 601 on the cam shaft 431 and a cam follower 602 formed near the upper end of an upstanding arm 603 pivoted on the lower part of the frame as B1. At about the middle of its length the arm 603 is connected as by a pin 605 to a link 606 which extends forwardly of the machine. Link 606 is connected as by a pin 607 with another upstanding arm 608 which is pivoted at its lower end to the machine frame as shown at 609.

The upper portion of the arm 608 is bifurcated to provide two upstanding portions 608A, projecting through suitable elongated slots in a cover plate 610 which carries the card positioning means 610A. A rod or shaft 611 connects the upper ends of the bifurcation 608A and supports a series of rearwardly projecting bars 612, equal in number to the sensing bars 511 and respectively aligned therewith.

Figure 21:
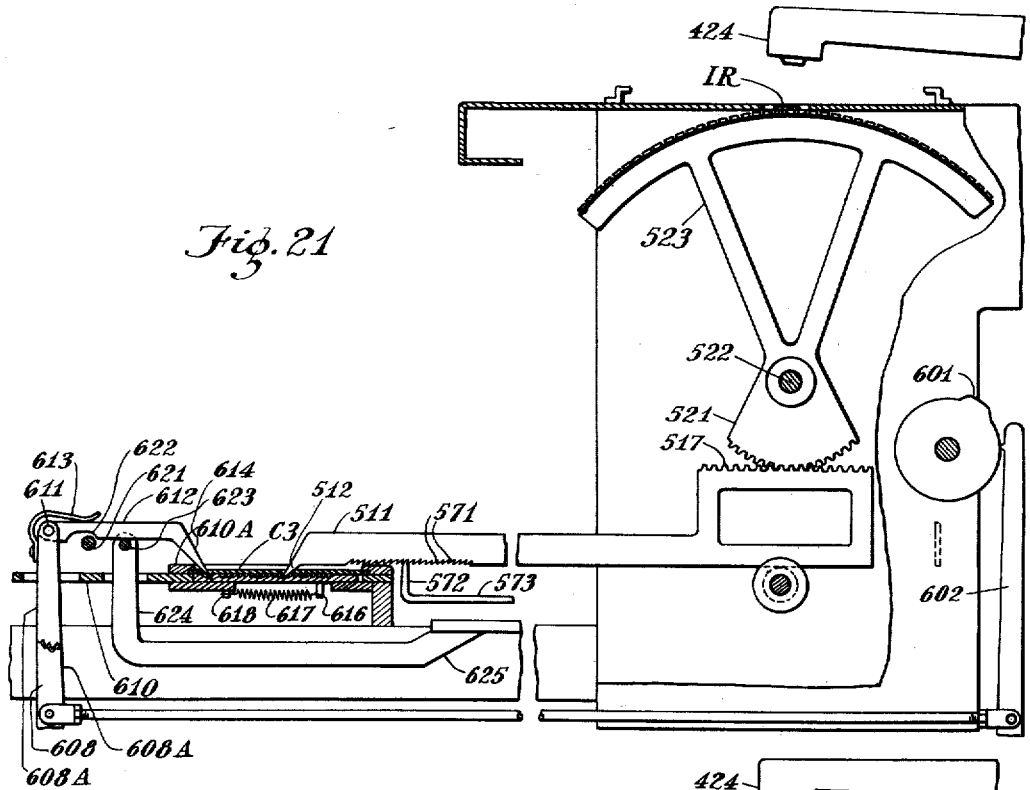
Fig. 21 is an enlarged fragmentary view of the modification shown in Fig. 18, certain parts being broken away and other parts being shown in section.

All of the bars 612 are urged in a clockwise direction, as viewed in Fig. 21, about the shaft 611 by a light comb spring 613 secured to the bifurcated arms 608A. Each bar 612 has a sensing tooth 614 formed on its rear end, such tooth being generally similar in construction to the sensing tooth 512 on each of the sensing bars 511.

Figure 22:
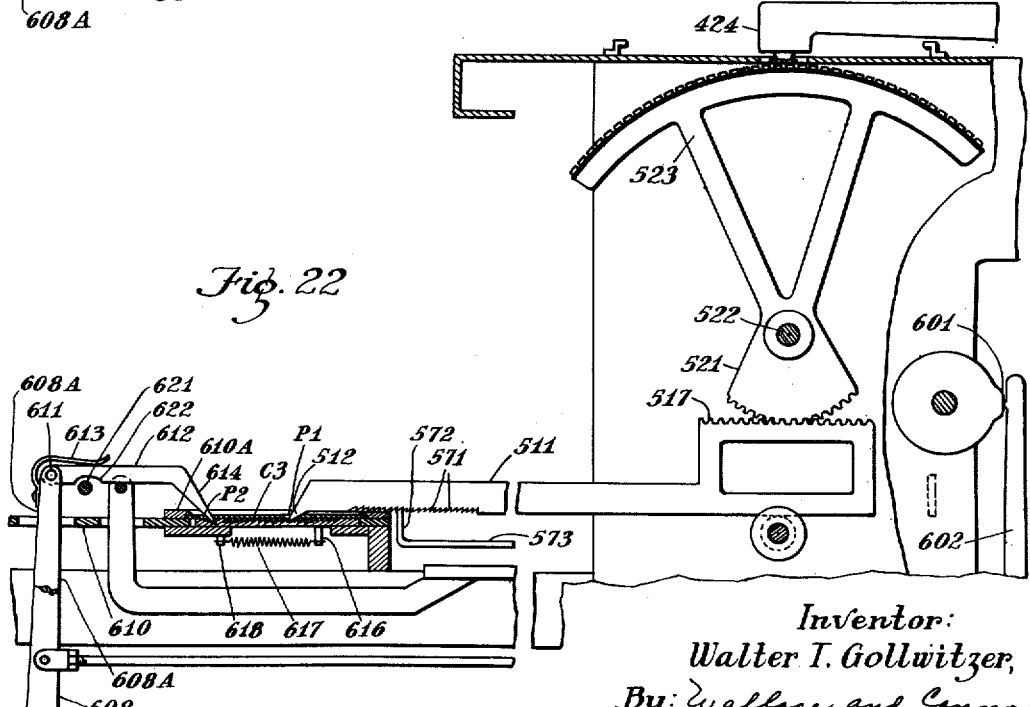
Fig. 22 is a view similar to Fig. 21, showing certain parts in another position.

As best shown in Figs. 20, 21 and 22, the serrated members 513, which correspond in general function to the serrated plate 413, are not unitary but consist of a series of separate serrated bars placed side by side. Each bar 513 is aligned with a sensing bar 511 and each has a single undercut tooth 615 near its front end which is disposed oppositely to the other teeth 514 in its upper surface. Each bar 513 also bears a depending lug 616 on its lower surface to which a tension spring 617 is secured. The other end of the spring is secured to a fastening element 618 on a stationary member, the spring thus tending to move the bar 513 to the front or to the left as seen in Figs. 21 and 22.

A stationary rod 621 is mounted in suitable brackets, not shown, in such a position as to ride in a rounded notch 622 formed in the lower edge of each of the bars 612. On extreme forward motion of the bars 612, this rod engages the rear ends of the notches and lifts the bars 612 out of contact with a card or like control device C3 which has been fed into sensing position by feed means such as those described above in connection with Fig. 13.

For raising the bars 612 out of contact with a control device as the card C3, a bail member is provided consisting of a rod 623 carried by upstanding portions 624 of a pair of bent arms 625. The arms 625 are rigidly secured to the bar 575 which, like the bar 475 previously described, is periodically rocked clockwise, as viewed in Fig. 18, about a pivot 577 to raise a locking bar into contact with the teeth 571 on the underside of the sensing bars 511, an arm and a cam on the shaft 437 serving to motivate such rocking movement. Hence when the locking plate 514 is raised into contact with the bars 511 to lift them from engagement with the card C3, or from engagement with serrations 514, the bars 612 are simultaneously raised out of engagement with the card C3 or engagement with the undercut tooth 615 in the slidable serrated bars 513.

The operation of the mechanism just described is as follows:

A card or the like control device C3 is provided with perforations P1 representing data to be printed and also with perforations P2 adapted to be sensed by a member 614 to determine whether the particular sensing bar 511 aligned therewith is or is not to be shifted half a space to dispose a desired printing character in printing position. If no perforation P2 is aligned with a tooth 614 on a bar 612, no shifting will occur. On the other hand if such a perforation is present, the tooth 614 will drop into it and when cam 601 moves the cam follower 602 to the right, as viewed in Fig. 18, the serrated bar 513 will be moved half a space to the right. At this time sensing by bars 511 has been accomplished and the tooth 512 therein has engaged an appropriate serration 514 on the particular serrated bar 513 with which it is aligned. Hence the sensing bar 511 is also moved to the right, as viewed in Fig. 21, a half space and the printing sector associated therewith has been properly disposed to print the desired character. Operation of the printing platens is accomplished in the manner described hereinabove and during this time the high part of cam 601 holds the follower 602 in its extreme right or clockwise position, as viewed in Fig. 18.

It will be understood that the teeth 614 on bars 612 selectively engage only those serrated bars 513 which are disposed beneath a perforation P2 in the control device C3. If no perforation occurs, no half spacing will be accomplished. This arrangement makes it possible, in effect, to double the data carried by a control device such as a card without materially increasing the size of the card or the number of perforations therein. In other words, along a given column of a card which is to be sensed by a single sensing bar as 511, a given number, say ten, index points may be used to set up any one of a similar number, i. e. ten, printing characters without the provision of a perforation P2. With the provision of a perforation P2, ten other characters may be set up selectively using the same ten index points. In effect twenty characters may be set up selectively with but ten index points plus a control point, a total of eleven. Similarly, if a card or the like contains twenty index points per column, forty characters may be set up by the use of a single additional perforation.

It will be appreciated that with the construction described above the locking bar 514 does not hold the sensing bars in the "half space" position after they are released from the serrated bars 513. Hence, with this arrangement printing should be accomplished before the bars are raised by members 574 and 624. However, by making the teeth 571 twice as numerous and half as large as the teeth 514 on the serrated plates or bars 514, the locking plate 574 would hold them in whatever position they might be set. As noted above the use of such small teeth may be objectionable, and this applies particularly to the teeth 514 on the bars 513 since they must stop as well as hold the sensing bars and the sectors with which they are connected. The destructive kinetic energy of such parts is considerable, particularly in rapid operations, even though the parts are made light in weight. The tooth strength required merely to hold a part which has already been stopped is much less and for some purposes the use of half size teeth 571 is satisfactory.

Fig. 23 is a plan view and Fig. 24 a vertical section of an arrangement by which cards may be successively fed to sensing position, either in the modification shown in Figs. 13 to 17 or that just described in connection with Figs. 18 to 22. A magazine 701 for control devices C is mounted above a feed table 702 and a reciprocating blade 703 removes the bottom card from the stack, after lowering of a flexing device 704, to advance the card to a feed roller 705 driven by a pulley 706 and belt 707 which, as shown in Fig. 18, may be passed about a pulley 708 driven by a coaxial pulley 709 which, in turn, is driven by a belt 710 from the motor M. The same arrangement is shown in Fig. 13. This feed mechanism is more fully described in my copending application Serial No. 672,581, filed May 27, 1946.

The control devices such as perforated cards C may be of any type presently known in the art but preferably they are of the small compact type described in the aforesaid copending application filed by the present inventor and John H. Gruver, Serial No. 648,075.

The sensing bars are indicated at 721 but they may be identical with sensing bars 411, Fig. 13 or 511, Fig. 18. The serrated plate 722 may be identical with plate 413 or it may be divided longitudinally into serrated strips or bars like the bars 513, Figs. 20 to 22.

Control devices, such as cards C, may be held in sensing position by a stop such as 727, Fig. 23, the feed roller 401 being held momentarily out of feeding engagement therewith by the cam 407 previously mentioned. Other cams 728 and 729 are carried, along with cam 407, by a shaft 408 which may be driven by means not described in detail herein but comprising a shaft 730 geared at one end to shaft 437, Fig. 13, and extending forwardly to connect, as by gearing not shown, with shaft 408. Shaft 408 may also carry an eccentric crank pin 732 connected to a link 733 which is attached to one arm 734 of a bell crank pivoted on a stud 735 to the right of the magazine 701. The other arm 736 of the bell crank may be bifurcated to engage an upstanding stud 737 carried by the reciprocable feed plate 703 previously mentioned. Since the specific details of feeding means and operating gearing form no part of my present invention, the foregoing will suffice.

It will be apparent that my sensing means have wide and varied applications and that although I have described specific applications thereof, as to printing data from control devices such as cards, many other applications thereof are contemplated. While in most cases I have referred to the sensing of perforated cards, it will be evident that other forms of indicia, on control devices other than cards, may likewise be sensed and utilized to perform particular and selective operations. For example, plates or the like bearing embossures, protuberances, recesses, notches, depressions and the like are just as susceptible to sensing, under the principles of my invention, as perforations in cards. The necessary modifications in sensing and control elements will, it is believed now be apparent to those skilled in the art to which this invention pertains.

Thus, while I have illustrated and described the preferred embodiments of my invention, it is to be understood that these are capable of variation and modification and I therefore do not wish to be limited to the precise details set forth, but desire to avail myself of such changes and alterations as fall within the purview of the following claims.

I claim:

1. A sensing device for use in recording apparatus and the like comprising a sensing element adapted for relative movement along a longitudinal path with respect to a record member to be sensed, said element being adapted to shift in an angular direction with respect to said record member and in a plane perpendicular thereto when an indicia carried by a record member is sensed thereby, and means included in said device and operable upon shifting of said device in response to sensing of an indicia to thereafter control and accurately determine and limit the longitudinal position of the sensing element in accordance with the location of the indicia sensed thereby.

2. A sensing device for use in recording apparatus and the like including a sensing element adapted for relative movement along a longitudinal path with respect to a record member to be sensed, said element being adapted for relative movement in a plane perpendicular to said record member when indicia carried by a record member is sensed thereby, and means carried by said device and operable upon said relative perpendicular movement of said element in response to sensing of an indicia to thereafter control and accurately limit a longitudinal position of the sensing element in accordance with the location of the indicia sensed thereby.

3. A sensing device for initiating a recording operation under the control of a record member bearing physical indicia representative of data to be recorded, said device comprising a structure bearing a sensing element and a stop element and adapted for relative movement across the surface of said record member and relative movement in a direction intersecting said surface, said sensing element being adapted to control said last named movement upon contact with an indicia borne by said record member, and said stop element being adapted to accurately limit said first movement after said movement in an intersecting direction to initiate an accurate recording operation according to the indicia sensed.

4. A sensing device for initiating a recording operation or the like under the control of a record member bearing physical indicia representative of data to be recorded, said device comprising a structure bearing a sensing element, said structure being adapted for sliding movement across the surface of said record member and being adapted for movement in a direction intersecting said surface upon contact between said sensing element and an indicia borne by said record member, and means carried by said structure effective upon said last named movement to accurately limit further movement of said structure to initiate an accurate recording operation according to the indicia sensed.

5. A sensing device for selectively initiating a mechanical operation under the control of a record member bearing approximately positioned physical indicia representing by its position the mechanical operation to be performed, said device comprising a structure bearing a sensing element and adapted for sliding movement across the surface of said record member and also adapted for movement in a direction intersecting said surface upon contact between said sensing element and an indicia borne by said record member, and means borne by said structure effective upon said last named movement to accurately position said structure and thereby accurately select said operation according to the indicia sensed and independent of minor inaccuracies in the position of such indicia.

6. A sensing device for selectively initiating an accurate mechanical operation under the control of a record member bearing approximately positioned physical indicia whose location is representative of the particular operation to be performed, said device comprising a structure incorporating a sensing element and a locking element, said structure being adapted for sliding movement across the surface of said record member and also being adapted for movement in a direction intersecting said member upon contact between said sensing element and an indicia, said locking means being effective upon said last named movement to lock said structure in an accurately located position to thereby initiate said accurate mechanical operation according to the indicia sensed and independent of minor inaccuracies in the position of such indicia.

7. A sensing device for initiating recording operations and the like under the control of a substantially plane record member by relative motion with respect to said record member, said device comprising a structure adapted for relative movement in a substantially parallel plane and in an intersecting plane with respect to said record member, a sensing element adapted to contact said record member during relative motion in said parallel plane and to move relatively with respect to said record member in said intersecting plane upon sensing an indicia on said member, and means carried by said device and effective upon said last-named relative movement to thereafter accurately limit and control relative motion between said device and said record member in said parallel plane.

8. In a sensing mechanism, a sensing station at which a perforated record member may be positioned, a plurality of sensing members movable across said sensing station, sensing elements on said sensing members adapted to enter perforations in the record members, means pivotally supporting said sensing members at points spaced longitudinally thereof a substantial distance from the sensing elements, positioning means comprising a relatively stationary device and cooperating means on said sensing members effective when a sensing element has entered a perforation to accurately locate a sensing member in a final position related to the location of the perforation, and means including said relatively stationary device operable upon said sensing members to withdraw the sensing elements thereof from perforations of a record member to thereby condition the record member for advancing movement.

9. In a record controlled apparatus, a sensing position at which record bearing members may be positioned, a plurality of sensing members having sensing elements thereon and being movable along longitudinal paths across said sensing position to sense indicia carried by a record member located at said position, said sensing members being adapted to shift in an angular direction with respect to the record member and in planes perpendicular thereto when indicia carried by such a record member is sensed by a sensing element, and cooperating means located in part on said sensing members and operable when a sensing member shifts angularly with respect to the record member as aforesaid in response to sensing of an indicia to thereafter control and accurately determine and limit the longitudinal position of the sensing member in accordance with the location of the indicia sensed thereby.

10. In a printing machine for printing variable numerical amounts, a plurality of type segments mounted for rocking movement, a plurality of gear segments secured to said type segments for imparting rocking movement thereto, a plurality of slides having rack teeth thereon engaged with respective ones of said segments for imparting set-up movement to said type segments when said slides are moved in one longitudinal direction, a plurality of sensing members one rigidly secured to each of said slides for longitudinal movement therewith, means providing a sensing station at which a perforated record bearing member or the like may be positioned, each of said sensing members having a sensing element thereon adapted to slide across the surface of a record member at sensing station and to enter the first perforation lying in its path, means for lifting one end of each of said sensing members to withdraw the sensing elements thereof from perforations which they may enter, said slides having longitudinal slots formed therein, and pivot means for said slides extended through said slots and lying in a plane positioned substantially normal to the path of longitudinal movement of said sensing members and radial with respect to the axis of rocking movement of said type segments, to thereby enable longitudinal movement of said slides as well as pivotal movement thereof with respect to said gear segments when said rigidly associated sensing members are lifted.

11. In a record controlled apparatus, a sensing station at which record bearing members may be positioned, a plurality of sensing members having sensing elements thereon and being movable along longitudinal paths across said sensing station, said elements being in contact with a record member located at said station to sense indicia carried by such a record, said sensing members being adapted to shift toward the record when indicia carried by such a record member is sensed by sensing elements thereof, means comprising a relatively stationary device and cooperating means on said sensing members effective when a sensing member shifts as aforesaid in response to sensing of an indicia to thereafter control and accurately limit longitudinal shifting movement of the sensing member, said last mentioned means including an element operable to shift said sensing members to move the sensing elements thereof out of contact with respect to a record member at the sensing station to thereby enable movement of the record member relative to said sensing station.

12. In a record controlled apparatus, a sensing position at which record bearing members may be positioned, a plurality of sensing members having sensing elements thereon and being movable along longitudinal paths across said sensing position to sense indicia carried by a record member located at said position, said sensing members being adapted to shift in an angular direction with respect to the record member and in planes perpendicular thereto when indicia carried by such a record member is sensed by a sensing element, and cooperating means comprising a relatively stationary member and elements on said sensing members cooperating with said stationary member and effective when a sensing member shifts angularly with respect to the record member as aforesaid in response to sensing of an indicia to thereafter control and accurately determine and limit the longitudinal position of the sensing member in accordance with the location of the indicia sensed thereby.

13. In a record controlled apparatus, a sensing position at which record bearing members may be positioned, a plurality of sensing members having sensing elements thereon and being movable along longitudinal paths across said sensing position to sense indicia carried by a record member located at said position, said sensing members being adapted to shift in an angular direction with respect to the record member and in planes perpendicular thereto when indicia carried by such a record member is sensed by a sensing element, and cooperating means comprising a relatively stationary member having locating teeth thereon spaced longitudinally with respect to the paths of movement of said sensing members, and teeth disposed on said sensing members for selective engagement with said locating teeth of said relatively stationary member when a sensing member shifts angularly with respect to the record member as aforesaid in response to sensing of an indicia to thereafter control and accurately determine and limit the longitudinal position of the sensing member in accordance with the location of the indicia sensed thereby.

14. In a record controlled apparatus, a sensing position at which record bearing members may be positioned, a plurality of sensing members having sensing elements thereon and being movable in sensing and restoring directions along longitudinal paths across said sensing position to sense indicia carried by a record member located at said position, said sensing members being adapted to shift in an angular direction with respect to the record member and in planes perpendicular thereto when indicia carried by such a record member is sensed by a sensing element, and cooperating means comprising a relatively stationary member having locating teeth thereon spaced from each other in the direction of said longitudinal paths and said locating teeth being of an under-cut configuration such that the under-cut sides thereof are faced opposite to said sensing direction, and cooperating teeth on said sensing members arranged to engage and interlock with said under-cut locating teeth selectively when a sensing member shifts angularly with respect to the record member as aforesaid in response to sensing of an indicia to thereafter control and accurately determine and limit the longitudinal position of the sensing member in accordance with the location of the indicia sensed thereby.

15. In a record controlled apparatus, a sensing position at which record bearing members may be positioned, a plurality of sensing members having sensing elements thereon and being movable along longitudinal paths across said sensing position to sense indicia carried by a record member located at said position, said sensing members being adapted to shift in an angular direction with respect to the record member and in planes perpendicular thereto when indicia carried by such a record member is sensed by a sensing element, positioning means including a locating member fixed against movement parallel to said path and having under-cut teeth thereon spaced from each other in a direction parallel to said path, and teeth on said sensing members operable to engage said under-cut teeth selectively when a sensing member shifts angularly with respect to the record member as aforesaid in response to sensing of an indicia, and while moving along its longitudinal sensing path, to thereafter control and accurately determine and limit the longitudinal position of the sensing member in accordance with the location of the indicia sensed thereby, and means for shifting said locating member transversely of said paths for spacing said sensing elements from a record bearing member.

16. A sensing device comprising a bar adapted for longitudinal sliding movement over the surface of a record member bearing physical indicia to sense said indicia, and adapted for rotational movement about a transverse axis upon contacting an indicia, a sensing element borne by said bar for feeling said indicia and controlling said rotational movement, a locking element borne by said bar, and accurate locking means cooperating with said locking element to selectively and accurately limit said sliding movement in response to said rotational movement.

17. A sensing device for selectively positioning a machine element under the control of selectively located indicia on a record member, comprising a slidable bar mounted for limited rotation about a transverse axis, a sensing feeler borne by said bar to impart said limited rotation to said bar upon sensing an indicia, locking means borne by said bar for sliding and rotational movement therewith, and positioning means comprising a series of accurately located locking elements adapted to be selectively engaged by the locking means borne by said bar in response to rotation of said bar incident to sensing an indicia.

18. A sensing device for selectively positioning a machine element under the control of indicia located on a record member to be sensed, comprising a slidable bar mounted for limited locking movement in a direction substantially perpendicular to the direction of said sliding when an indicia is sensed and including a sensing element and a locking element, and an accurately located locking member mounted independently of said bar adapted to be engaged by said locking element as an incident to such locking movement to selectively and accurately limit sliding movement of said bar according to indicia sensed on said record member.

19. A sensing device as claimed in claim 16, wherein said sensing element and said locking element are located adjacent each other on said bar so that movement of said sensing element incident to a sensing operation is imparted immediately and in substantially equal degree to said locking element.

20. A sensing device as claimed in claim 16 wherein said sensing element and said locking element are located at spaced positions.

21. A sensing device as claimed in claim 16 wherein said sensing element is located farther from said axis of rotation of said bar than said locking element.

22. A sensing device as claimed in claim 16 wherein said locking element is located farther from said axis of rotation of said bar than said sensing element.

23. A sensing device as claimed in claim 16 wherein said bar includes a series of positioning members in addition to said locking element for holding said bar in its selective position after release of said locking element.

24. A sensing device comprising a slidable bar mounted for limited rotational movement about a transverse axis and including a sensing feeler, a series of locking elements, a locking tooth movable with said bar and adapted to cooperate selectively with said series of locking elements to limit the position of said bar in response to a sensing operation, a gear member, and a rack movable with said bar and adapted to cooperate with said gear member to position said gear member in accordance with the selected limiting position of said bar.

25. A device for operations under the control of a record member by relative motion with respect to said record member, said device comprising a bar mounted for sensing movement over the surface of said record member and also in a direction intersecting said surface, a sensing element carried by said bar and adapted to contact said record member during said movement over said surface and to move relatively with respect to said record member in said intersecting direction upon sensing an indicia on said record member, a series of accurately located stop elements, and means carried by said device and effective on said last-named relative movement to selectively engage said stop elements and thereby accurately control a selecting operation indicated by the indicia sensed.

26. A device for initiating recording operations and the like under the control of a substantially plane record member by relative motion with respect to said record member, said device comprising a structure adapted for relative movement in substantially parallel and intersecting planes with respect to the plane of said record member, a sensing element adapted to contact said record member during relative motion in said parallel plane and to move relatively with respect to said record member in said intersecting plane upon sensing an indicia on said member, a series of accurately located stop elements and means carried by said device and effective upon said last-named relative movement to selectively engage said stop elements and thereby accurately control a selecting operation indicated by the indicia sensed.

27. In a machine adapted to be controlled by a record member bearing physical indicia formed thereon with approximate accuracy, the combination of a device adapted to sense said indicia, a series of accurately positioned stops, a stop element borne by said device and adapted to selectively engage said stops when an indicia is sensed, and a mechanical element adapted to be positioned selectively by said device under general control of said indicia and under specific control of said stops.

28. In a machine of the character described, the combination of a record member bearing control indicia formed thereon with approximate accuracy, a movable sensing and positioning bar, a series of accurately positioned stops, means on said bar for selectively engaging said stops upon sensing an indicia, a mechanical element adapted to be positioned selectively by said bar under general control of said indicia and under specific control of said stops, and means for maintaining said elements in said position for an interval after sensing of said indicia has been accomplished and while said record member is being removed.

29. In a machine of the character described, a combination of means for sensing indicia represented by perforations formed with approximate accuracy in a card, a series of accurately located stops selectively engageable by said sensing means upon sensing a perforation in such card, and a mechanical element adapted to be positioned selectively by said sensing means under general control of said perforation and under specific control of said stops.

30. In a machine adapted to be controlled by a record member bearing physical indicia according to a two-element code wherein primary indicia in any one of several index points on the record member may each represent two different symbols or the like in dependence upon the presence or absence of secondary indicia in another predetermined index position, first and second sensing bars movable along parallel paths toward each other to sense said primary and secondary indicia respectively, said sensing bars being movable laterally with respect to such paths when an indicia is sensed thereby, a slidable stop bar mounted for limited movement between first and second position and normally urged to said first position and embodying a plurality of accurately positioned stops, a stop element borne by said first sensing bar and engageable with said stops selectively as an incident to lateral movement of said first sensing bar when a primary indicia is sensed thereby, an abutment on said stop bar adapted to be engaged by said second sensing bar to shift said stop bar to said second position when said second sensing bar senses a secondary indicia, and means for moving said first and second sensing bars through their sensing movements in succession.

WALTER T. GOLLWITZER.

REFERENCES CITED

The following references are of record in the file of this patent:

UNITED STATES PATENTS

| Number | Name | Date |
|---|---|---|
| 2,110,854 | Fuller et al. | Mar. 15, 1938 |
| 2,269,894 | Cleven | Jan. 13, 1942 |
| 2,340,581 | Cooper | Feb. 1, 1944 |